United States Patent
Takamatsu et al.

(10) Patent No.: US 10,495,962 B2
(45) Date of Patent: *Dec. 3, 2019

(54) LIGHT SOURCE UNIT, LIGHT SOURCE APPARATUS, AND IMAGE DISPLAY APPARATUS

(71) Applicant: Sony Corporation, Tokyo (JP)

(72) Inventors: Takashi Takamatsu, Tokyo (JP); Yoshihisa Aikoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 449 days.

This patent is subject to a terminal disclaimer.

(21) Appl. No.: 14/434,476

(22) PCT Filed: Sep. 6, 2013

(86) PCT No.: PCT/JP2013/005288
§ 371 (c)(1),
(2) Date: Apr. 9, 2015

(87) PCT Pub. No.: WO2014/064877
PCT Pub. Date: May 1, 2014

(65) Prior Publication Data
US 2015/0277217 A1    Oct. 1, 2015

(30) Foreign Application Priority Data

Oct. 26, 2012 (JP) ................... 2012-236691

(51) Int. Cl.
*G03B 21/20* (2006.01)
*F21V 9/30* (2018.01)
*F21V 7/04* (2006.01)

(52) U.S. Cl.
CPC ............ *G03B 21/2066* (2013.01); *F21V 7/04* (2013.01); *F21V 9/30* (2018.02); *G03B 21/204* (2013.01); *G03B 21/2013* (2013.01)

(58) Field of Classification Search
CPC .. G03B 21/2066; G03B 21/204; G03B 21/20; F21V 7/04; F21V 9/16
(Continued)

(56) References Cited

U.S. PATENT DOCUMENTS 6,425,677 B1   7/2002   Chuang
8,192,050 B2   6/2012   Ido et al.
(Continued)

FOREIGN PATENT DOCUMENTS

CN   101283305 A   10/2008
CN   102540679 A   7/2012
(Continued)

OTHER PUBLICATIONS

Machine Translation of JP2011070959 A.*
(Continued)

*Primary Examiner* — Steven Whitesell Gordon
*Assistant Examiner* — Jerry L Brooks
(74) *Attorney, Agent, or Firm* — Wolf, Greenfield & Sacks, P.C.

(57) ABSTRACT

A light source unit, light source apparatus (100) and an image display device (800), each including at least two reflecting surfaces (35, 37) configured to reflect a first light and/or collect the first light to a point on a light emitter, at least one (35) of the at least two reflecting surfaces (35, 37) is an aspheric reflecting surface.

24 Claims, 22 Drawing Sheets

(58) Field of Classification Search
USPC .................. 353/31, 99; 362/235, 297, 84
See application file for complete search history.

(56) References Cited

U.S. PATENT DOCUMENTS

| | | | |
|---|---|---|---|
| 8,702,241 B2 * | 4/2014 | Ohsugi | ............... H04N 9/3111 |
| | | | 353/100 |
| 9,395,611 B2 | 7/2016 | Nishikawa et al. | |
| 9,482,860 B2 | 11/2016 | Takamatsu | |
| 9,575,401 B2 | 2/2017 | Nishikawa et al. | |
| 2004/0252281 A1 * | 12/2004 | Fischer | ............... F21V 5/006 |
| | | | 353/53 |
| 2005/0286251 A1 | 12/2005 | Smith | |
| 2007/0081336 A1 | 4/2007 | Bierhuizen et al. | |
| 2007/0217192 A1 | 9/2007 | Hiratsuka | |
| 2010/0110679 A1 | 5/2010 | Teng et al. | |
| 2010/0118530 A1 * | 5/2010 | Nagai | ............... H01L 25/0753 |
| | | | 362/235 |
| 2010/0246174 A1 | 9/2010 | Ido et al. | |
| 2012/0075591 A1 | 3/2012 | Ogura et al. | |
| 2014/0111775 A1 | 4/2014 | Nishikawa et al. | |
| 2014/0362350 A1 | 12/2014 | Takamatsu | |
| 2015/0049307 A1 | 2/2015 | Kashihara | |
| 2016/0282709 A1 | 9/2016 | Nishikawa et al. | |

FOREIGN PATENT DOCUMENTS

| | | | | |
|---|---|---|---|---|
| CN | 103775869 A | | 5/2014 | |
| JP | 2001-356404 A | | 12/2001 | |
| JP | 3102988 U | | 7/2004 | |
| JP | 2007-183384 A | | 7/2007 | |
| JP | 2010-091594 A | | 4/2010 | |
| JP | 2011070959 A | * | 4/2011 | ............ F21S 8/04 |
| JP | 2011-123318 A | | 6/2011 | |
| JP | 2011-150160 A | | 8/2011 | |
| JP | 2011-165555 A | | 8/2011 | |
| JP | 2011-243400 A | | 12/2011 | |
| JP | 2012-032553 A | | 2/2012 | |
| JP | 2012-063708 A | | 3/2012 | |
| JP | 2012-069386 A | | 4/2012 | |
| JP | 2012-088657 A | | 5/2012 | |
| JP | 2012-195233 A | | 10/2012 | |

OTHER PUBLICATIONS

European Office Communication dated Feb. 23, 2016 in connection with European Application No. 13765531.2.

Chinese Office Action dated Dec. 22, 2017 in connection with Chinese Application No. 2013800544729, and English translation thereof.

* cited by examiner

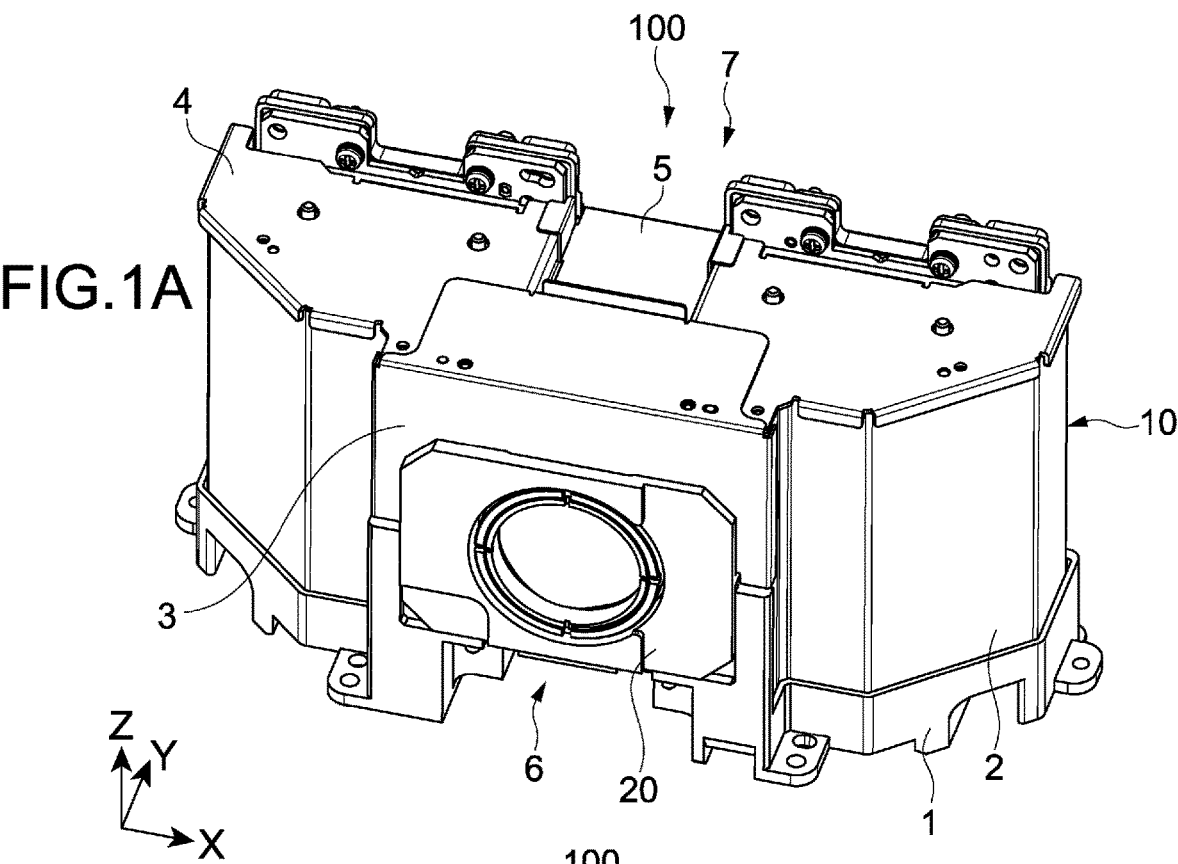
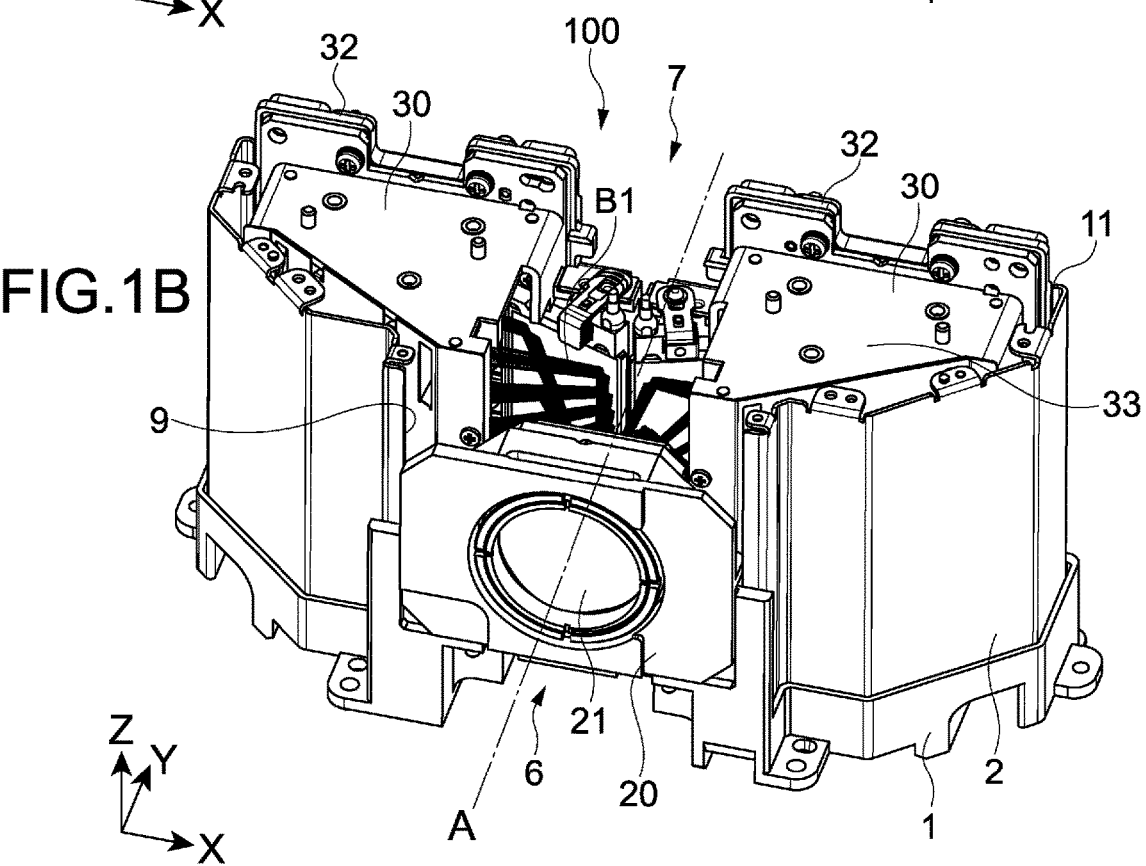

| NA of object side | 0.8067 |
|---|---|
| Focal length (f1) of first optical system | 5.355 |
| Focal length (f2) of second optical system | 55.620 |

| | | Curvature radius | Interval | n(445nm) | Remarks |
|---|---|---|---|---|---|
| | First light-source surface | infinity | 0.300 | | Initial surface of array |
| First optical system | S1 | infinity | 0.250 | 1.53308 | |
| | S2 | infinity | 1.780 | | |
| | S3 | infinity | 4.500 | 1.49959 | |
| | S4(Aspheric surface) | -15.700 | 50.000 | | End surface of array |
| Second optical system | S5(Aspheric surface) | -111.240 | -32.290 | | Aspheric reflecting surface |
| | S6(Eccentric surface) | infinity | 17.500 | | Planar reflecting surface |
| | S7(Eccentric surface) | infinity | 0.700 | 1.53308 | |
| | Second light-source surface | infinity | 0.000 | | |

| K | A2 | A3 | A4 | A5 | A6 | A8 | A10 |
|---|---|---|---|---|---|---|---|
| 10.50000 | -1.590E-01 | 5.876E-05 | -3.294E-03 | 2.013E-04 | -1.879E-04 | 2.255E-06 | -5.572E-07 |

S5

| K |
|---|
| -1.00000 |

S6

| Rotation about y axis | 20 degrees |
|---|---|

S7

| Shift along x axis | 14.97mm |
|---|---|

FIG.19

LIGHT SOURCE UNIT, LIGHT SOURCE APPARATUS, AND IMAGE DISPLAY APPARATUS

CROSS REFERENCE TO RELATED APPLICATIONS

This application claims the benefit under 35 U.S.C. § 371 as a U.S. National Stage Entry of International Application No. PCT/JP2013/005288, filed Sep. 6, 2013, entitled "LIGHT SOURCE UNIT, LIGHT SOURCE APPARATUS, AND IMAGE DISPLAY APPARATUS", which claims priority to Japanese Patent Application Number 2012-236691, filed Feb. 21, 2014, each of which is hereby incorporated by reference in its entirety.

TECHNICAL FIELD

The present disclosure relates to a light source unit, a light source apparatus, and an image display apparatus using the light source unit and the light source apparatus.

BACKGROUND ART

Recently, products including solid-state light sources such as a light-emitting diode (LED) and a laser diode (LD) have been increasingly used. The solid-state light sources are adopted as light sources used in projectors for presentation and digital cinema, instead of mercury lamps, xenon lamps, and the like used in related art. The solid-state light sources such as LEDs have advantages such as having long lifetime, no replacement of lamps, which is necessary in related art, and lighting-up immediately after power-on.

Such a projector includes a type in which a solid-state light source such as an LED is directly used as a light source. On the other hand, there is another type in which a light emitter such as a phosphor, which is excited by excitation light to emit light, is used as a light source. In this case, the solid-state light source is used as an excitation light source that outputs excitation light.

For example, a light source device disclosed in Patent Literature 1 includes first and second solid-state light source groups, first and second reflecting sections, and a light collecting optical system. The first and second solid-state light source groups are arranged so as to have different optical-axis directions. The first reflecting section reflects light from the first solid-state light source group so as to follow a traveling direction of light from the second solid-state light source group. The second reflecting section reflects the light from the first and second solid-state light source groups, whose traveling directions are aligned with each other, such that the interval between the optical axes becomes short. The light collecting optical system is formed of a plano-convex lens having an aspheric surface and collects the light reflected by the second reflecting section to a predetermined light-collecting position (see paragraphs [0047] to [0056], FIG. 2, etc. of Patent Literature 1).

CITATION LIST

Patent Literature

PTL 1: Japanese Patent Application Laid-open No. 2012-118302

SUMMARY

Technical Problem

In the optical system disclosed in Patent Literature 1, in the case where the number of light sources is increased in order to attain a high luminance, the first and second reflecting sections and the like are inevitably increased in size, which enlarges the apparatus. In addition, the configurations of the respective members are complicated and an optical path of light coming into the plano-convex lens also has limitations. Therefore, it is difficult to flexibly change the arrangement, shape, and the like of the members. As a result, it is difficult to establish an optical system according to a necessary luminance or shape.

In view of the circumstances as described above, it is desirable to provide a light source unit, a light source apparatus, and an image display apparatus that are capable of attaining a high luminance while suppressing an increase in size of an apparatus, and of easily achieving a structure appropriate to a necessary luminance or shape.

Solution to Problem

Accordingly, embodiments of the present application are directed to a light source unit comprising at least two reflecting surfaces configured to reflect a first light and/or collect the first light to a point on a light emitter. At least one of the at least two reflecting surfaces is an aspheric reflecting surface. In some embodiments, at least one of the at least two reflecting surfaces is a planar reflecting surface. In some embodiments, the light source unit includes a support portion configured to support each of the at least two reflecting surfaces. In some embodiments, each of the at least two reflecting surfaces comprises metal and/or glass. In some embodiments, the aspheric reflecting surface reflects the first light prior to any of the other at least two reflecting surfaces.

In some embodiments, the light emitter converts at least a portion of the first light into a second light with a wavelength shorter than a wavelength of the first light. The light emitter may include a phosphor layer rotatable upon a shaft.

In some embodiments, the light source unit includes a plurality of light sources arranged in a planar array for emitting the first light. Each of the plurality of light sources may be a laser. In some embodiments, the aspheric reflecting surface is arranged obliquely with respect to a plane of the planar array. In some embodiments, a direction in which the first light is emitted is substantially the same as a direction in which a second light from the light emitter is emitted.

In some embodiments, the aspheric reflecting surface is rotationally symmetric. In some embodiments, the aspheric reflecting surface is a paraboloidal reflecting surface.

In some embodiments, the light source unit also includes at least one adjustment mechanism for adjusting a position and/or an angle of at least one of the reflecting surfaces. In some embodiments, the at least one of the reflecting surfaces adjusted by the at least one adjustment mechanism comprises a planar reflecting surface.

Some embodiments of the present application are directed to a light source apparatus comprising a plurality of light source units, wherein each of the plurality of light source units comprises: at least two reflecting surfaces configured to reflect a first light and/or collect the first light to a point on a light emitter. At least one of the at least two reflecting surfaces is an aspheric reflecting surface. In some embodiments, the plurality of light source units are arranged symmetrically about an optical axis.

Some embodiments of the present application are directed to an image display apparatus comprising: a light source apparatus configured to generate an output light, the light source apparatus comprising at least one light source unit, each of the at least one light source units comprising: at least two reflecting surfaces configured to reflect a first light and/or collect the first light to a point on a light emitter. At least one of the at least two reflecting surfaces is an aspheric reflecting surface. The image display apparatus also includes a lighting member configured to receive the output light and generate an image using the output light.

In some embodiments, the light source unit includes a support portion configured to support each of the at least two reflecting surfaces. In some embodiments, each of the at least two reflecting surfaces comprises metal and/or glass. In some embodiments, the aspheric reflecting surface reflects the first light prior to any of the other at least two reflecting surfaces.

In some embodiments, the light emitter converts at least a portion of the first light into a second light with a wavelength shorter than a wavelength of the first light. The light emitter may include a phosphor layer rotatable upon a shaft. In some embodiments, the light source unit also includes at least one adjustment mechanism for adjusting a position and/or an angle of at least one of the reflecting surfaces. In some embodiments, the at least one of the reflecting surfaces adjusted by the at least one adjustment mechanism comprises a planar reflecting surface.

In some embodiments, the light source unit includes a plurality of light sources arranged in a planar array for emitting the first light. Each of the plurality of light sources may be a laser. In some embodiments, the aspheric reflecting surface is arranged obliquely with respect to a plane of the planar array. In some embodiments, a direction in which the first light is emitted is substantially the same as a direction in which a second light from the light emitter is emitted.

Advantageous Effects of Invention

As described above, according to the present disclosure, it is possible to attain a high luminance while suppressing an increase in size of an apparatus, and easily achieve a structure appropriate to a necessary luminance or shape.

BRIEF DESCRIPTION OF DRAWINGS

FIGS. 1A and 1B are perspective views each showing a configuration example of a light source apparatus according to a first embodiment of the present disclosure.

FIG. 18 is a table showing data on the light collecting unit in the example.

FIG. 19 is a table showing data on the light collecting unit in the example.

DESCRIPTION OF EMBODIMENTS

Figure 2:
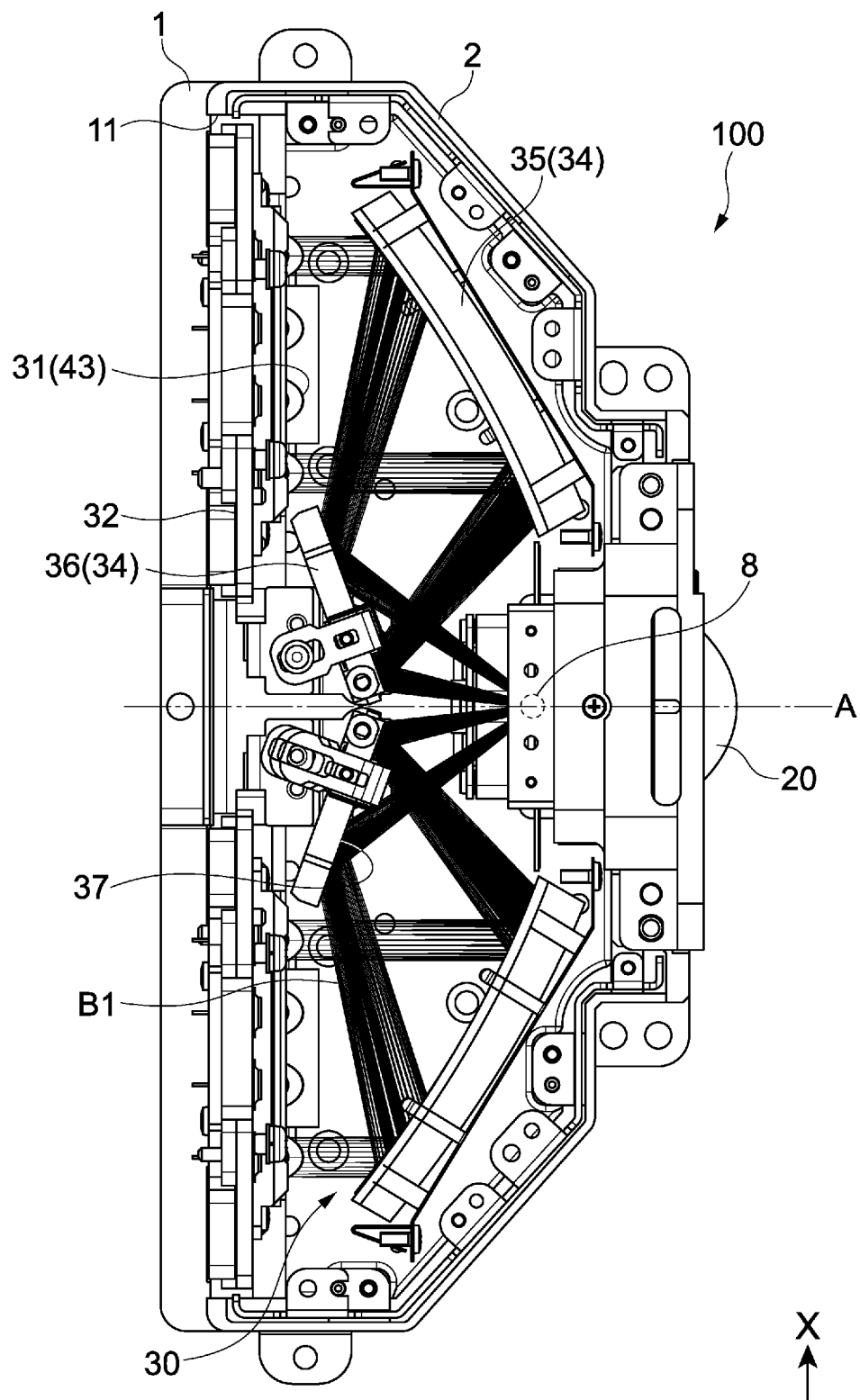
FIG. 2 is a plan view of the light source apparatus shown in FIG. 1B, viewed from above.

Hereinafter, an embodiment according to the present disclosure will be described with reference to the drawings.

(Light Source Apparatus)

FIGS. 1A and 1B are perspective views each showing a configuration example of a light source apparatus 100 according to an embodiment of the present disclosure. The light source apparatus 100 is a light source apparatus for a projector and has a type in which laser light in a blue wavelength range is combined with light in red and green wavelength ranges, the light being generated from a fluorescent substance excited by the laser light in the blue wavelength range, to output white light.

As shown in FIG. 1A, the light source apparatus 100 includes a base 1 and a side wall portion 2. The base 1 is provided to a bottom portion of the light source apparatus 100. The side wall portion 2 is fixed to the base 1. Further, the light source apparatus 100 includes a front surface portion 3, a top surface portion 4, and a lid portion 5. The front surface portion 3 and the top surface portion 4 are connected to the side wall portion 2. The lid portion 5 is connected to the top surface portion 4. Those side wall portion 2, front surface portion 3, top surface portion 4, and lid portion 5 form a casing 10 of the light source apparatus 100.

The base 1 has an elongate shape extending in one direction. A longitudinal direction of the elongated base 1 is a horizontal direction of the light source apparatus 100, and a short-side direction perpendicular to the longitudinal direction is a front-back direction thereof. Therefore, one of two longitudinal portions that are opposed to each other in the short-side direction is a front side 6, and the other of the longitudinal portions is a rear side 7. Further, a direction perpendicular to both the longitudinal direction and the short-side direction is a height direction of the light source apparatus 100. In an example shown in FIGS. 1A and 1B, an x-axis direction, a y-axis direction, and a z-axis direction correspond to the horizontal direction, the front-back direction, and the height direction, respectively.

FIG. 1B is a view omitting illustration of the front surface portion 3, the top surface portion 4, and the lid portion 5, and showing an example of the internal configuration of the light source apparatus 100. As shown in FIG. 1B, in the side wall portion 2, a notch 9 is formed at the center of the front side 6 and an opening 11 is formed on the rear side 7. A phosphor unit 20 is arranged in the notch 9 on the front side 6 of the side wall portion 2. The phosphor unit 20 is fixed to the base 1 via the notch 9 such that an output surface 21 faces forward. Therefore, an optical axis A of light output from the phosphor unit 20 extends long the y-axis direction substantially through the center of the base 1.

Two light collecting units 30 are arranged on the rear side 7 of the phosphor unit 20. The light collecting units 30 are arranged to be symmetric about the optical axis A of light output from the phosphor unit 20. As will be described later in detail, each of the light collecting units 30 includes a plurality of laser light sources 31 capable of outputting blue laser light B1. As shown in FIG. 1B, two light source portions 32 each including the plurality of laser light sources 31 are arranged side by side in the longitudinal direction in the opening 11 on the rear side 7 of the side wall portion 2. The light collecting units 30 collect the blue laser light B1 toward the phosphor unit 20. The blue laser light B1 is output from the plurality of laser light sources 31.

As shown in FIG. 1A, the top surface portion 4 is arranged on the upper side of the two light collecting units 30. The top surface portion 4 is connected to the side wall portion 2 and the two light collecting units 30. The front surface portion 3 is arranged on the upper side of the phosphor unit 20 and connected to the phosphor unit 20, the top surface portion 4, and the base 1. The lid portion 5 is arranged so as to cover the intermediate portion between the two light collecting units 30 and connected to the top surface portion 4.

A method of fixing and connecting the members is not limited. For example, the members are engaged with one another via predetermined engaging portions and fixed and connected to one another by screw clamp or the like.

Figure 3:
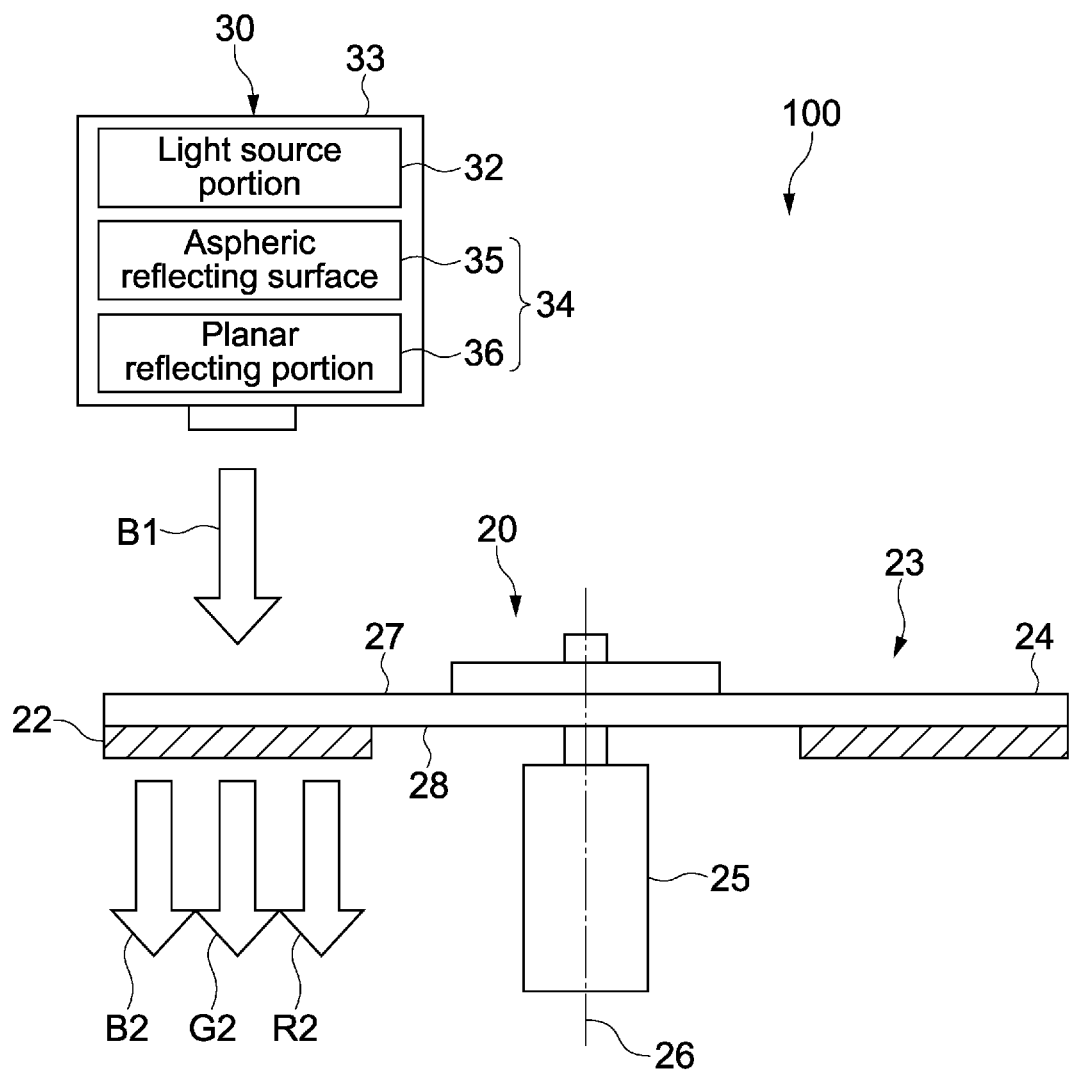
FIG. 3 is a schematic configuration view for describing light emission by the light source apparatus.

FIG. 2 is a plan view of the light source apparatus 100 shown in FIG. 1B, viewed from above. In FIG. 2, illustration of a support portion 33 is omitted. The support portion 33 supports the light collecting units 30 as one unit. FIG. 3 is a schematic configuration view for describing light emission by the light source apparatus 100.

The light collecting unit 30 includes the light source portion 32, a light collecting optical system 34, and the support portion 33. The light source portion 32 includes the plurality of laser light sources 31. The light collecting optical system 34 collects the blue laser light B1, which is output light from the plurality of laser light sources 31, to a predetermined point 8 (hereinafter, also referred to as light collecting point 8). The support portion 33 supports the light source portion 32 and the light collecting optical system 34, as one unit.

For example, the plurality of laser light sources 31 are blue laser light sources capable of oscillating the blue laser light B1 having a peak wavelength of an emission intensity within the wavelength range of from 400 nm to 500 nm. The plurality of laser light sources 31 correspond to one or more solid-state light sources capable of outputting light in a predetermined wavelength range as output light. Other light sources such as a light-emitting diode (LED) may be used as the solid-state light source. Further, the light in a predetermined wavelength range is also not limited to the blue laser light B1.

The light collecting optical system 34 includes an aspheric reflecting surface 35 and a planar reflecting portion 36. The aspheric reflecting surface 35 reflects and collects output light from the plurality of laser light sources 31. The planar reflecting portion 36 includes a planar reflecting surface 37. The planar reflecting surface 37 reflects the output light reflected by the aspheric reflecting surface 35 to be collected at the predetermined point 8. The planar reflecting portion 36 collects the blue laser light B1 serving as the output light to the predetermined point 8 on a phosphor 22 of the phosphor unit 20.

The support portion 33 described above supports the light source portion 32, the aspheric reflecting surface 35, and the planar reflecting portion 36, as one unit. The light collecting unit 30 corresponds to a light source unit in this embodiment. The light collecting unit 30 will be described later in detail.

A phosphor wheel 23 shown in FIG. 3 is provided in the phosphor unit 20. The phosphor wheel 23 includes a disk-like substrate 24 and a phosphor layer 22. The substrate 24 transmits the blue laser light B1. The phosphor layer 22 is provided on an arrangement surface 28 of the substrate 24. A motor 25 that drives the phosphor wheel 23 is connected to the center of the substrate 24. The phosphor wheel 23 has a rotating shaft 26 on a normal line passing through the center of the substrate 24 and is rotatable about the rotating shaft 26.

The rotating shaft 26 of the phosphor wheel 23 is provided such that its extending direction is the same direction as the optical axis A passing substantially through the center of the phosphor unit 20. Further, the rotating shaft 26 is arranged at a position different from the optical axis A such that the predetermined point 8 of the phosphor layer 22 is located substantially at the center of the phosphor unit 20 (on the optical axis A). As shown in FIG. 2, the light collecting unit 30 collects the blue laser light B1 to the predetermined point 8 located substantially at the center of the phosphor unit 20.

As shown in FIG. 3, the phosphor wheel 23 is arranged such that a main surface 27, which is one of the two main surfaces of the substrate 24 and on which the phosphor layer 22 is not provided, faces the light collecting unit 30. Further, the phosphor wheel 23 is arranged such that a focal position of the blue laser light B1 collected by the light collecting unit 30 matches a predetermined point on the phosphor layer 22.

The phosphor layer 22 corresponds to a light emitter that is excited by light from the plurality of laser light sources 31 and emits visible light in a wavelength longer than that of the light from the plurality of laser light sources 31. In this embodiment, the phosphor layer 22 contains a fluorescent substance that emits fluorescence by being excited by the blue laser light B1 having a center wavelength of about 445 nm. The phosphor layer 22 converts part of the blue laser light B1, which is output by the plurality of laser light sources 31, into light in a wavelength range including a range up to the red or green wavelength range (that is, yellow light) and then outputs the resultant light.

As the fluorescent substance contained in the phosphor layer 22, for example, a YAG (yttrium, aluminum, garnet)-based phosphor is used. It should be noted that the type of fluorescent substance, a wavelength range of excited light, and a wavelength range of the visible light generated by excitation are not limited.

Further, since the phosphor layer 22 absorbs part of the excitation light and also transmits part of the excitation light, the phosphor layer 22 can output the blue laser light B1 that has been output from the plurality of laser light sources 31. Thus, the light output from the phosphor layer 22 is white light obtained by combination of the blue excitation light and the yellow fluorescence. In order to transmit part of the excitation light in such a manner, the phosphor layer 22 may contain filler particles serving as particulate substance having light transparency, for example.

By the rotation of the substrate 24 by the motor 25, the laser light sources 31 apply the excitation light to the phosphor layer 22 while relatively moving an application position on the phosphor layer 22. Thus, light containing blue laser light B2, which has passed through the phosphor layer 22, and green light G2 and red light R2 as visible light output from the phosphor layer 22 is output as output light by the phosphor unit 20. The rotation of the phosphor wheel 23 allows avoidance of deterioration of the phosphor layer 22 due to the excitation light applied to a certain position of the phosphor layer 22 for a long period of time.

The phosphor unit 20 corresponds to an output portion in this embodiment. It should be noted that the configuration of the phosphor unit 20 is not limited, and for example, the phosphor wheel 23 may not be used. For example, the phosphor layer 22 may be held by another holding portion, and blue laser light from the light collecting unit 30 may be collected thereto.

Figure 4:
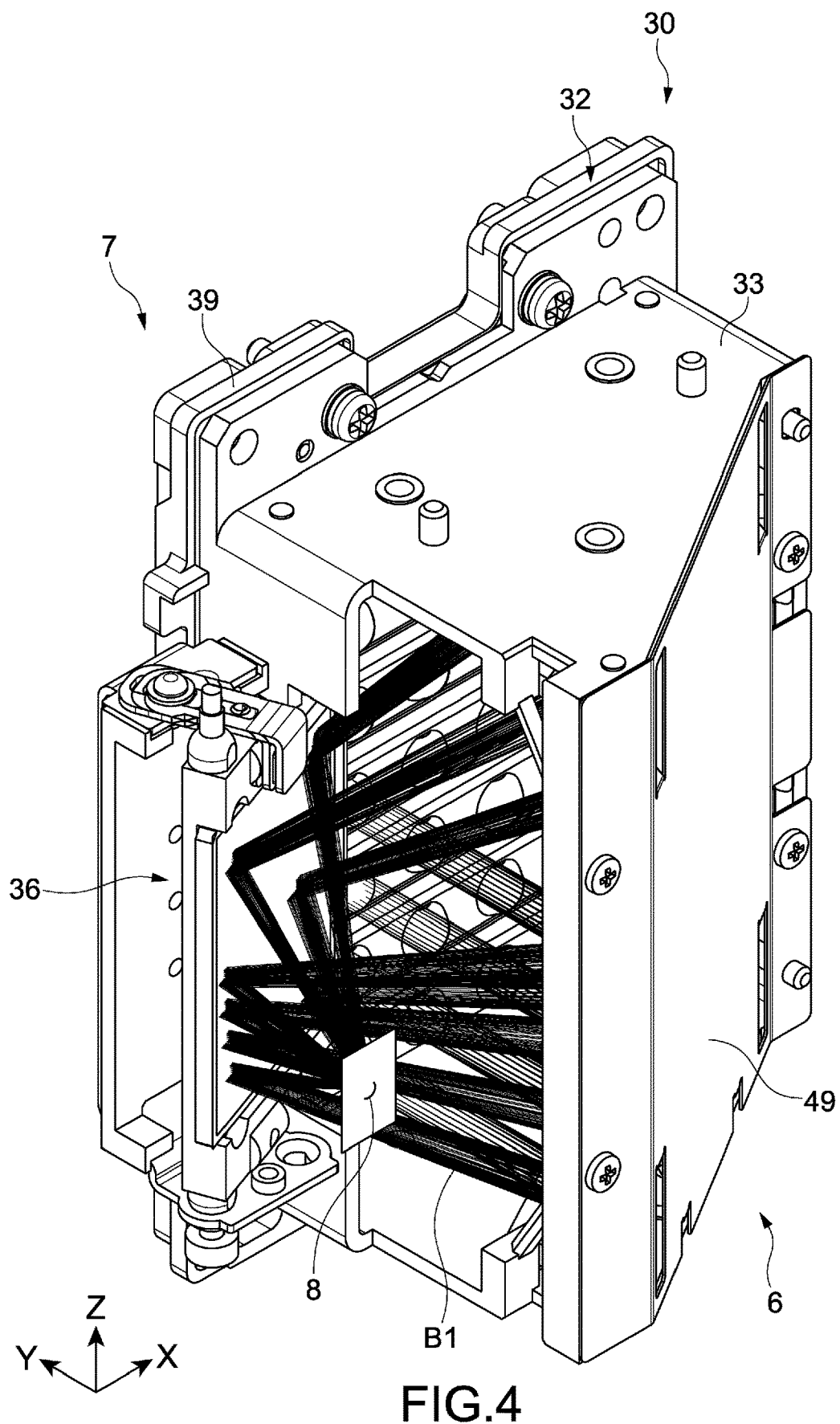
FIG. 4 is a perspective view showing a configuration example of a light collecting unit.
Figure 5:
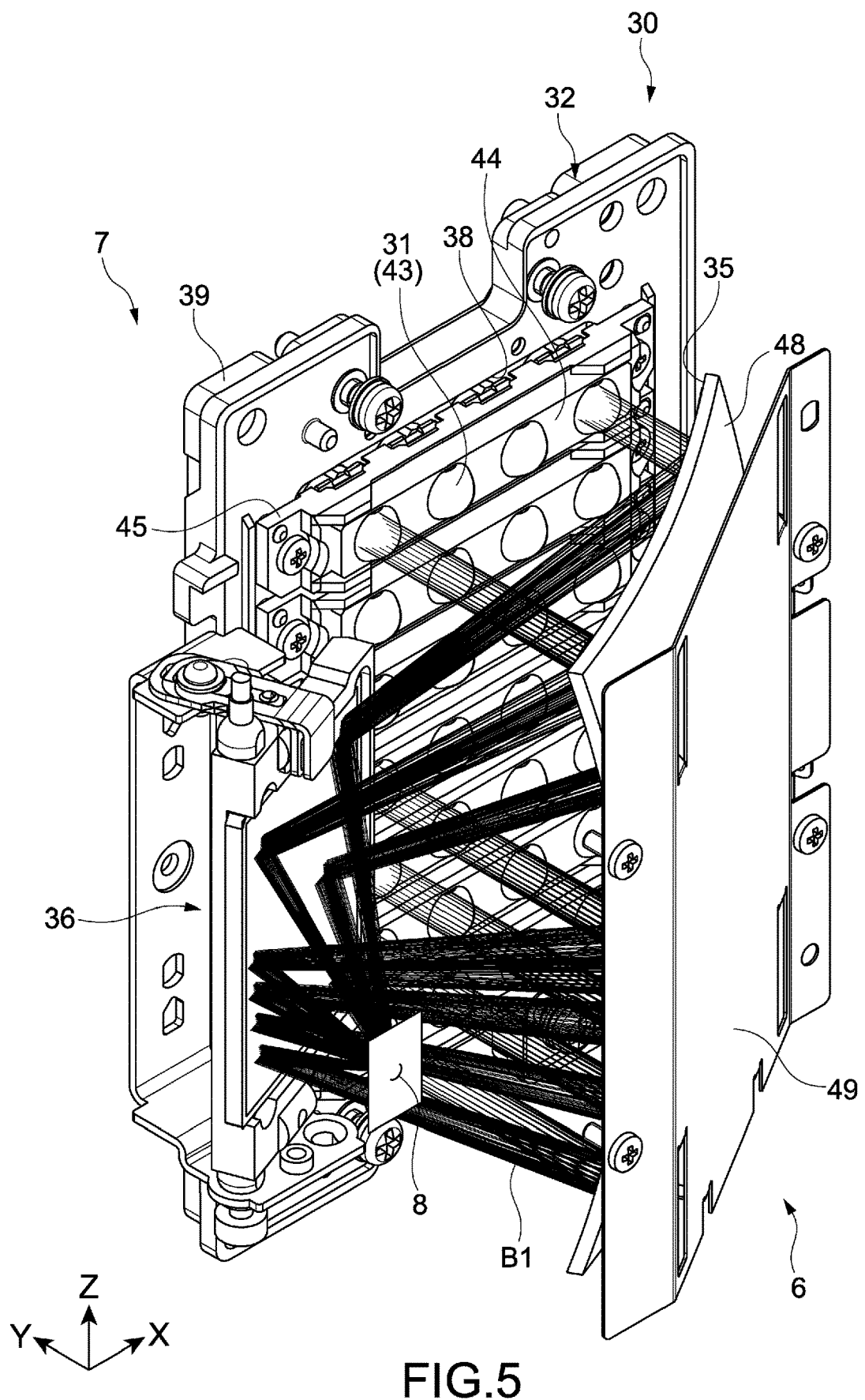
FIG. 5 is a perspective view showing a configuration example of the light collecting unit.
Figure 6:
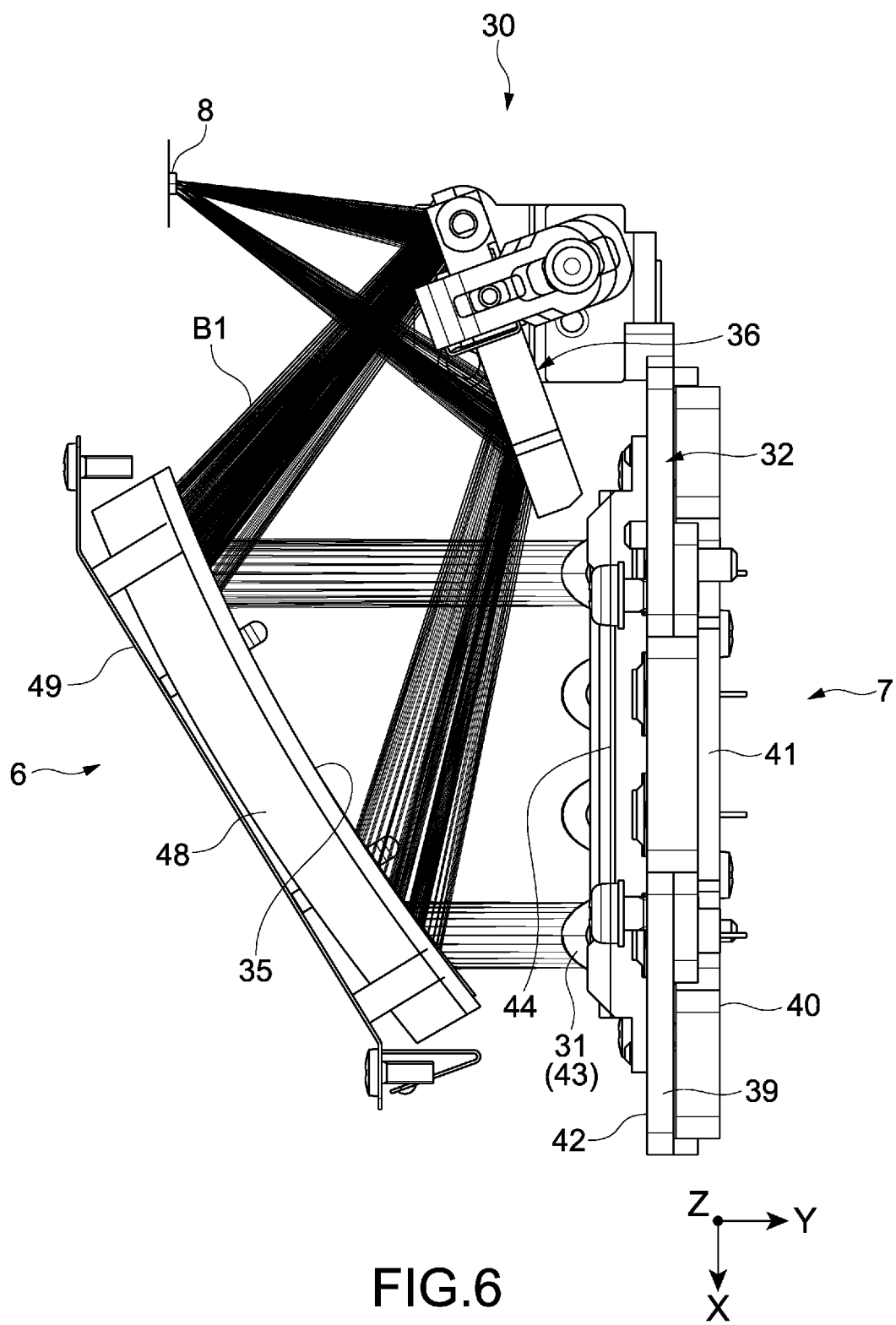
FIG. 6 is a plan view of the light collecting unit shown in FIG. 5, viewed from above.

FIGS. 4 and 5 are perspective views each showing a configuration example of the light collecting unit 30. In FIG. 5, the illustration of the support portion 33 is omitted. FIG. 6 is a plan view of the light collecting unit 30 shown in FIG. 5 viewed from above.

As described above, the light collecting unit 30 includes the light source portion 32, the aspheric reflecting surface 35, the planar reflecting portion 36, and the support portion 33 that supports those light source portion 32, aspheric reflecting surface 35, and planar reflecting portion 36 as one unit. The shape or size of the support portion 33 is not limited as long as the support portion 33 can integrally support those components as one unit. Typically, a casing-shaped support portion 33 is used in order to prevent the blue laser light B1 from being leaked to the outside. Thus, use efficiency of the blue laser light B1 is improved.

As shown in FIG. 5, in this embodiment, a laser light source array including 28 pieces of the laser light sources 31 is used as the light source portion 32. The light source portion 32 includes a plate-like frame 39 in which an opening 38 is formed. A mount substrate 41 onto which the plurality of laser light sources 31 are mounted is arranged on a rear surface 40 of the frame 39 (on the surface on the rear side 7). The plurality of laser light sources 31 output the blue laser light B1 toward the front side 6 via the opening 38 of the frame 39. The plurality of laser light sources 31 are arranged in a matrix of four columns in the horizontal direction (x-axis direction) by seven rows in the height direction (z-axis direction) of the light source apparatus 100.

On a front surface 42 of the frame 39 (on the surface on the front side 6), 28 pieces of collimator lenses 43 are arranged to correspond to the positions of the plurality of laser light sources 31. The collimator lens 43 is a rotation symmetric, aspheric lens and converts the blue laser light B1 output from each laser light source 31 into a substantially parallel light flux. In this embodiment, a lens unit 44 is used.

In the lens unit 44, four collimator lenses 43 arranged linearly are integrally formed. Seven pieces of the lens units 44 are arranged along the height direction. The lens unit 44 is held with a fixing member 45 that is fixed to the frame 39. It should be noted that the collimator lens 43 is described as the laser light source 31 in the figures in some cases.

The configuration of the light source portion 32 is not limited to the above and the above-mentioned frame 39 may not be used. The number of laser light sources 31, the arrangement thereof, the configuration of the collimator lens 43, and the like are also not limited. For example, a collimator lens may be arranged for each laser light source 31 without using the lens unit 44. Alternatively, light fluxes from the plurality of laser light sources 31 may be collected by one collimator lens and converted into a substantially parallel light flux. It should be noted that the figures show part of the light fluxes of the blue laser light B1 output from the plurality of laser light sources 31 (collimator lenses 43).

On the front side 6 of the plurality of laser light sources 31, a reflecting member 48 including the aspheric reflecting surface 35 is arranged. The reflecting member 48 is arranged such that the aspheric reflecting surface 35 faces the plurality of laser light sources 31. The aspheric reflecting surface 35 is arranged obliquely with respect to a planar direction (xz plane direction) of the surface 42 on which the plurality of laser light sources 31 are arranged. Thus, the blue laser light B1 is reflected toward the planar reflecting portion 36. As the reflecting member 48, for example, a reflective mirror is used.

The aspheric reflecting surface 35 is typically a concave reflecting surface like a mirror surface, and the shape thereof is designed so as to reflect and collect the blue laser light B1 from the plurality of laser light sources 31. The material of the reflecting member 48 is not limited, and a metal material and glass are used therefor, for example.

Figure 7:
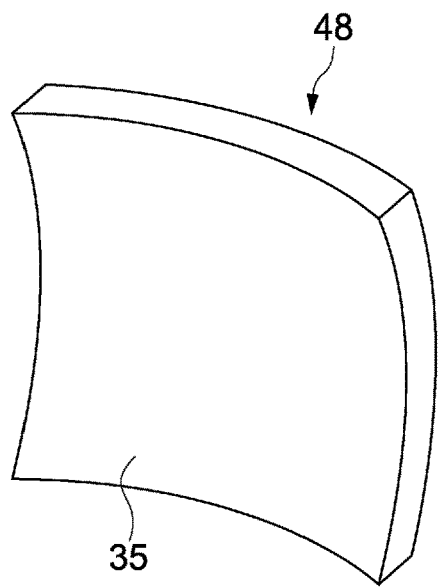
FIG. 7 is a schematic view showing an example of a reflecting member.
Figure 8:
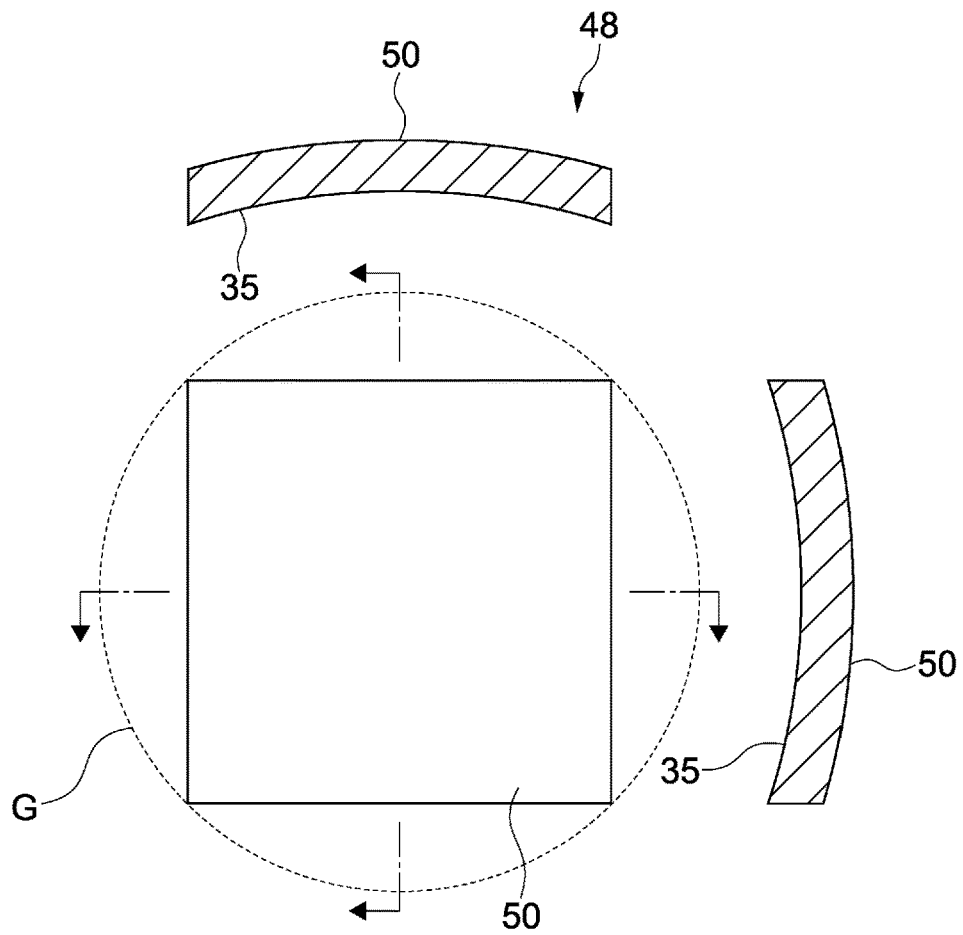
FIG. 8 is a schematic view showing an example of the reflecting member.

FIGS. 7 and 8 are schematic views each showing an example of the reflecting member 48. The aspheric reflecting surface 35 of the reflecting member 48 may be a rotation symmetric, aspheric surface or a free-form surface having no axis of rotational symmetry. The shape of the aspheric reflecting surface 35 is set appropriately based on the positions of the plurality of laser light sources 31, a direction in which light is reflected, and a position at which light is collected, the level of the light flux of the laser light B1 coming into the aspheric reflecting surface 35, an incident angle, and the like.

FIG. 8 is a view showing the reflecting member 48, viewed from the side of a back surface 50, which is the side opposite to the aspheric reflecting surface 35. Further, FIG. 8 also shows cross-sectional views of the reflecting member 48 taken along directions substantially perpendicular to each other. As shown in FIG. 8, the reflecting member 48 has a substantially rectangular outer shape when viewed from the side of the back surface 50 (hereinafter, the outer shape viewed from the side of the back surface 50 is simply referred to as an outer shape). Further, the reflecting member 48 has a cross section whose shape is formed to correspond to the shape of the aspheric reflecting surface 35.

For example, the outer shape of the reflecting member 48 can be appropriately changed in accordance with the size of an area to which the blue laser light B1 converted into a substantially parallel light flux by the collimator lens 43 is applied. For example, as shown in FIG. 8, the substantially rectangular reflecting member 48 may be used. Alternatively, a reflecting member 48 having a triangular shape or another multangular shape, and the like may be used. Thus, compared with the case where a light collecting lens is used to collect the light from the plurality of laser light sources 31, the outer shape of the reflecting member 48 can be appropriately adjusted to be made smaller.

For example, it is assumed that the blue laser light B1 is applied to the entire area of the aspheric reflecting surface 35 of the reflecting member 48 shown in FIG. 8. In this case, when the blue laser light B1 is intended to be collected using the light collecting lens, a lens with such a size that covers at least the outer shape of the reflecting member 48 (see circle G indicated by a broken line in FIG. 8) has to be used. In this case, the thickness of the reflecting member 48 (see the cross-sectional views of FIG. 8) can also be reduced compared with the case of using the light collecting lens. As a result, it is possible to produce a compact light collecting optical system 34 and suppress an increase in size of the light source apparatus 100. Further, it is clearly found that a reflecting surface having a shape of a paraboloidal surface is more suitable for a small-sized light collecting optical system than a generally-used refracting system including lenses, also in terms of an optical system of a telescope.

As shown in FIG. 6, the reflecting member 48 is supported by a support member 49. As shown in FIG. 4, the support member 49 is fixed to the support portion 33 by screw clamp. Thus, the reflecting member 48 is supported by the support portion 33.

Figure 9:
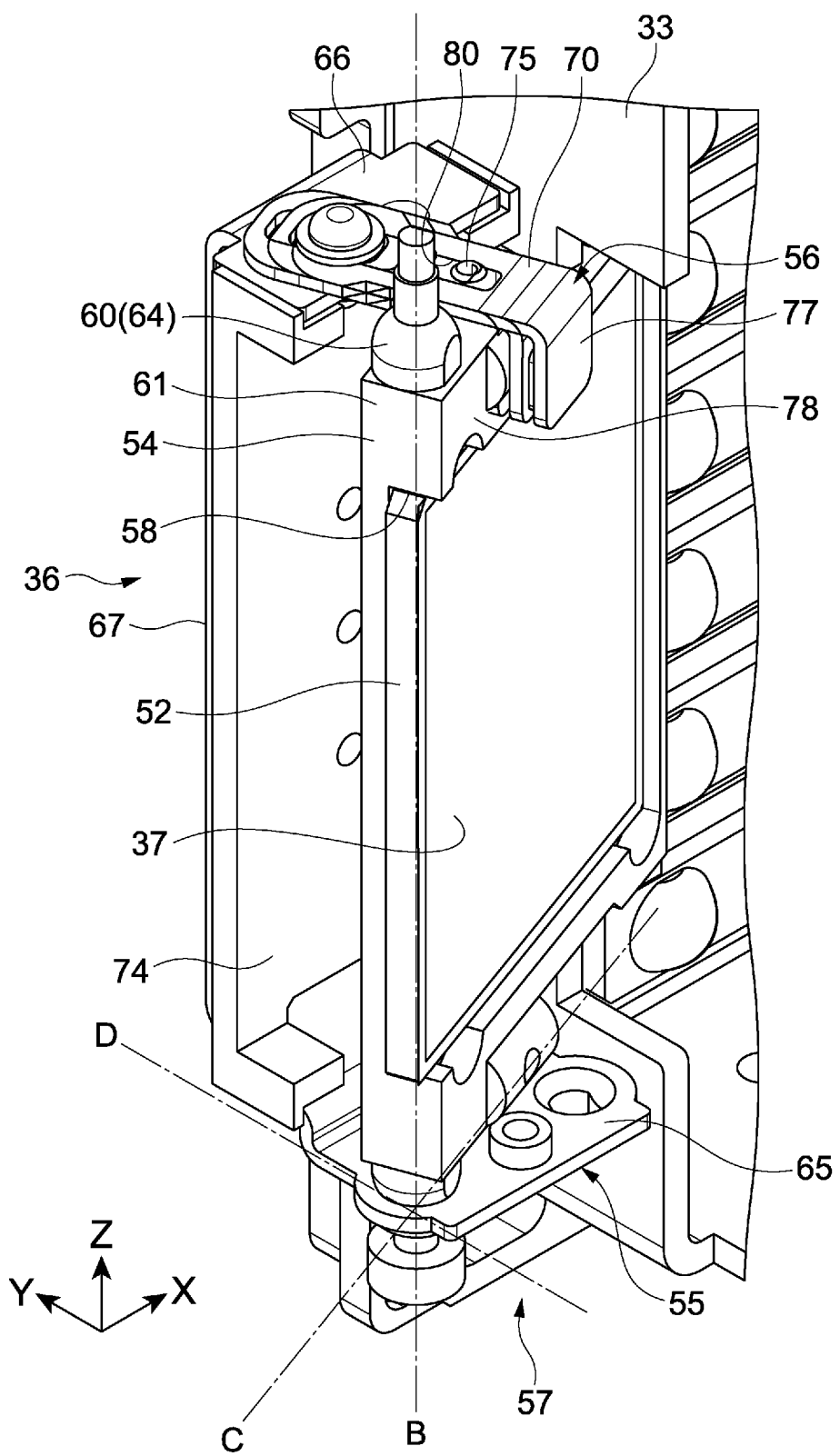
FIG. 9 is an enlarged view of a planar reflecting portion supported by a support portion.
Figure 10:
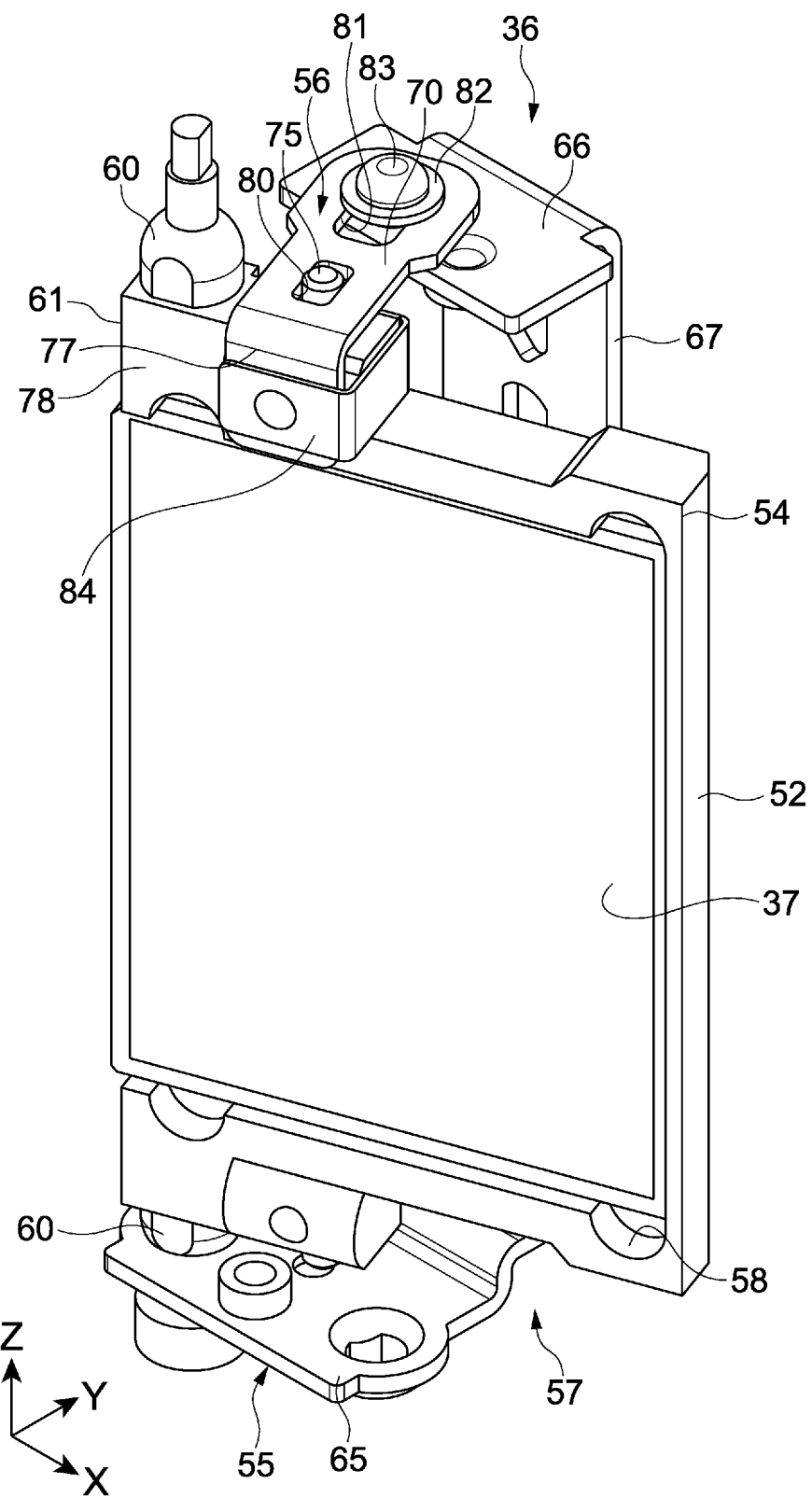
FIG. 10 is a view showing a configuration example of the planar reflecting portion.

FIG. 9 is an enlarged view of the planar reflecting portion 36 supported by the support portion 33. FIG. 10 is a view showing a configuration example of the planar reflecting portion 36.

The planar reflecting portion 36 includes a planar reflecting member 52 having the planar reflecting surface 37. The planar reflecting surface 37 reflects the blue laser light B1 reflected on the aspheric reflecting surface 35 to the predetermined point 8 of the phosphor layer 22. Typically, the planar reflecting surface 37 is a minor surface. As the planar reflecting member 52, for example, a reflective mirror is used. The material of the planar reflecting member 52 is not limited, and a metal material and glass are used therefor, for example.

Further, the planar reflecting portion 36 includes a member holding portion 54, a support frame 55, and a coupling portion 56. The member holding portion 54 holds the planar reflecting member 52. The support frame 55 supports the lower portion of the member holding portion 54 so as to be rotatable and tiltable. The coupling portion 56 couples the member holding portion 54 and the support frame 55 to each other at the upper portion of the member holding portion 54. In this embodiment, the member holding portion 54 (corresponding to a holding portion), the support frame 55 (corresponding to a shaft support portion), and the coupling portion 56 form an adjustment mechanism 57 that adjusts a position and an angle of the planar reflecting surface 37.

As shown in FIGS. 9 and 10, the member holding portion 54 has a plate shape and includes a concave portion 58 that is formed on an almost entire area of one surface thereof. The plate-like planar reflecting member 52 is fitted into the concave portion 58. The member holding portion 54 is vertically provided along the height direction (z-axis direction). A normal direction of the surface on which the concave portion 58 is formed, that is, a normal direction of the planar reflecting surface 37 is a direction perpendicular to the z axis.

Shaft portions 60 extending in the z-axis direction are formed at end portions of the member holding portion 54. The shaft portions 60 are formed integrally with the member holding portion 54, and for example, when the shaft portions 60 rotate, the member holding portion 54 also rotates. Therefore, the planar reflecting member 52 supported by the member holding portion 54 also moves integrally with the shaft portions 60. In other words, the member holding portion 54 holds the planar reflecting surface 37 integrally with the shaft portions 60.

As shown in FIGS. 9 and 10, the shaft portions 60 are formed at the upper and lower portions of the member holding portion 54 so as to be arranged linearly. At the upper and lower portions of the member holding portion 54, attachment portions 61 are formed, which will be described later. The shaft portions 60 are formed on the attachment portions 61. The attachment portions 61 formed at the upper and lower portions of the member holding portion 54 have the same shape. The shaft portions 60 formed at the upper and lower portions of the member holding portion 54 have the same shape.

One of the two shaft portions 60 is inserted into a shaft support hole 63 that is formed in the support frame 55. The other shaft portion 60 is used as an operation portion 64 that is operated when an angle of the planar reflecting surface 37 is adjusted. The coupling portion 56 is attached to the attachment portion 61 on the side of the operation portion 64. For example, the shaft portion 60 to be inserted into the shaft support hole 63 is appropriately selected based on a position at which the planar reflecting surface 37 is arranged, a design of the light collecting unit 30, and the like.

When the member holding portion 54 is formed, the shaft portions 60 having the same shape are formed at the upper and lower portions of the member holding portion 54. In other words, since the shaft portion 60 and the operation portion 64 are formed into the same shape without discriminating therebetween, manufacturing costs of the member holding portion 54 can be lowered. Further, since the shaft portion 60 to be inserted into the shaft support hole 63 can be selected, the degree of freedom on the attachment of the member holding portion 54 can be increased.

The support frame 55 includes a lower support portion 65, an upper support portion 66, and a coupling frame 67 that couples those lower support portion 65 and upper support portion 66. The lower support portion 65 and the upper support portion 66 are arranged at positions substantially equal to the lower portion and the upper portion of the member holding portion 54, respectively, in the z-axis direction so as to be opposed to each other. The coupling frame 67 extends along the z-axis direction and couples the lower support portion 65 and the upper support portion 66.

The shaft support hole 63 that supports the shaft portion 60 of the member holding portion 54 is formed in the lower support portion 65. The shaft portion 60 is inserted into the shaft support hole 63, and thus the member holding portion 54 is supported so as to be rotatable and tiltable. Hereinafter, the shape of the shaft support hole 63 and that of the shaft portion 60 will be described in detail.

Figure 11A:
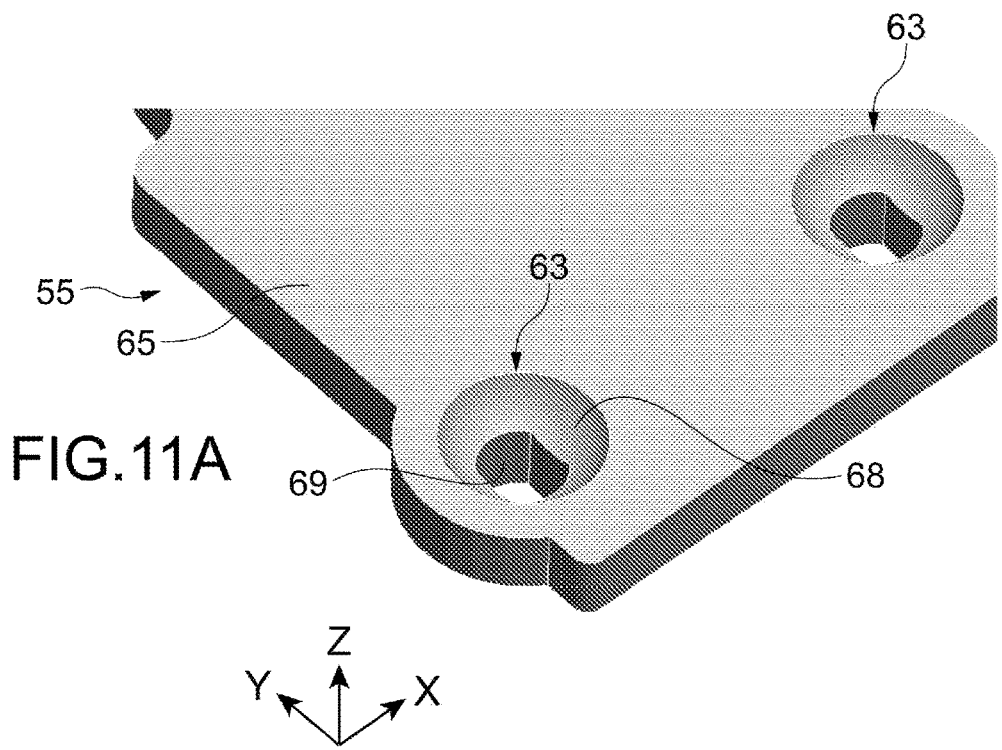
FIGS. 11A and 11B are views each showing a shaft support hole formed in a lower support portion of a support frame.
Figure 11B:
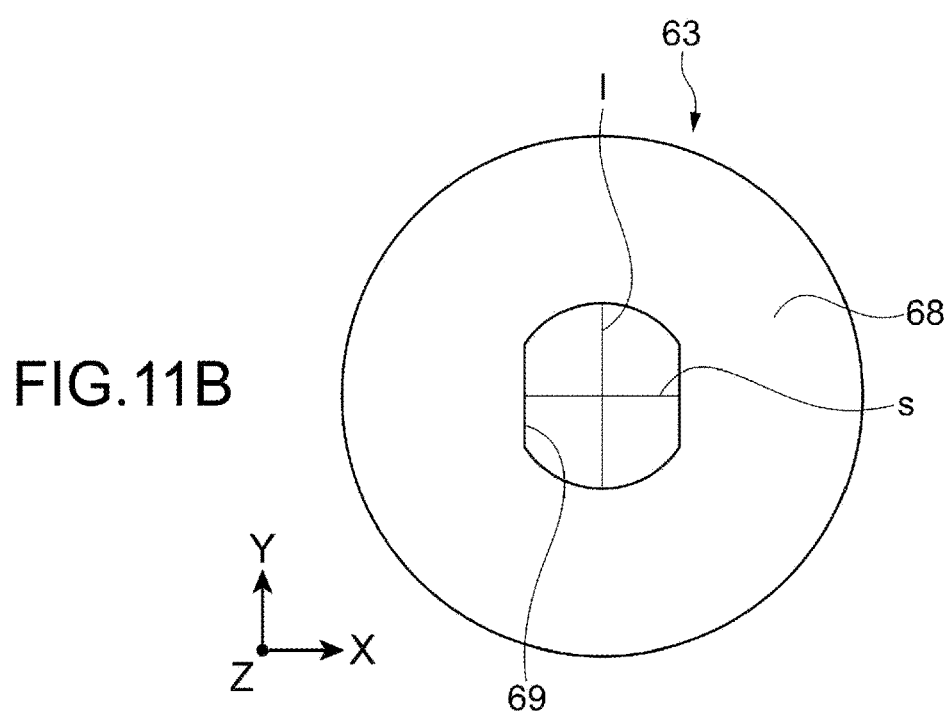

FIGS. 11A and 11B are views each showing the shaft support hole 63 formed in the lower support portion 65 of the support frame 55. FIG. 11A is a perspective view of the lower support portion 65, and FIG. 11B is a plan view of the shaft support hole 63 viewed from above.

As shown in FIGS. 11A and 11B, the shaft support hole 63 is formed at an end portion of the lower support portion 65 in the x-axis direction. The shaft support hole 63 is formed of a concave portion 68 (spherical support) and an oval through-hole 69. The concave portion 68 is formed to have a substantially spherical shape. The oval through-hole 69 is formed on the bottom portion of the concave portion 68. The concave portion 68 is formed into a substantially hemispherical shape. Further, the oval through-hole 69 is formed such that a long axis 1 thereof coincides with the y-axis direction of the light source apparatus 100, which is the front-back direction of the light source apparatus 100. A short axis s of the oval through-hole 69 coincides with the x-axis direction of the light source apparatus 100, which is the horizontal direction thereof.

Figure 12:
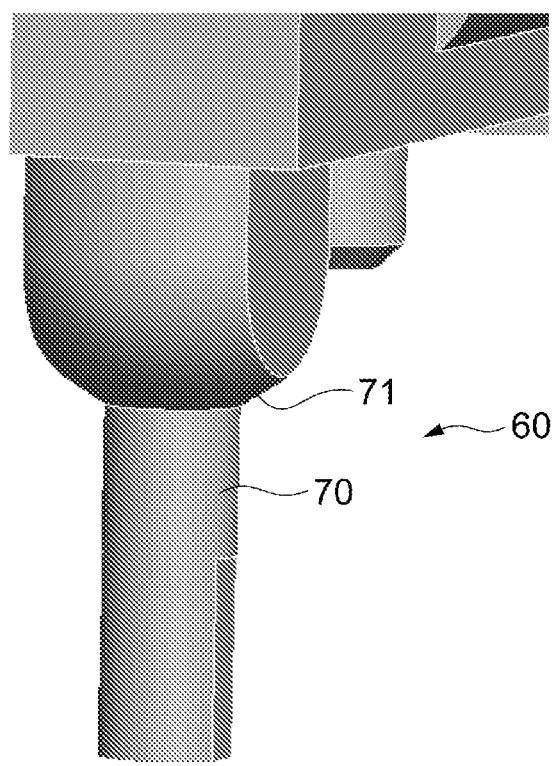
FIG. 12 is a perspective view showing a shaft portion to be inserted into the shaft support hole.

FIG. 12 is a perspective view showing the shaft portion 60 to be inserted into the shaft support hole 63. The shaft portion 60 includes an insertion part 70 and a sphere portion 71. The insertion part 70 has a circular cross section. The sphere portion 71 is formed at the upper portion of the insertion part 70. The insertion part 70 has a cross section whose diameter is substantially equal to that of the short axis s of the through-hole 69 of the shaft support hole 63. The sphere portion 71 has a substantially hemispherical shape that corresponds to the shape of the concave portion 68 of the shaft support hole 63. The insertion part 70 is inserted into the through-hole 69 so at to be rotatable. At that time, the sphere portion 71 is supported by the concave portion 68 of the shaft support hole 63 so as to be movable.

Figure 13:
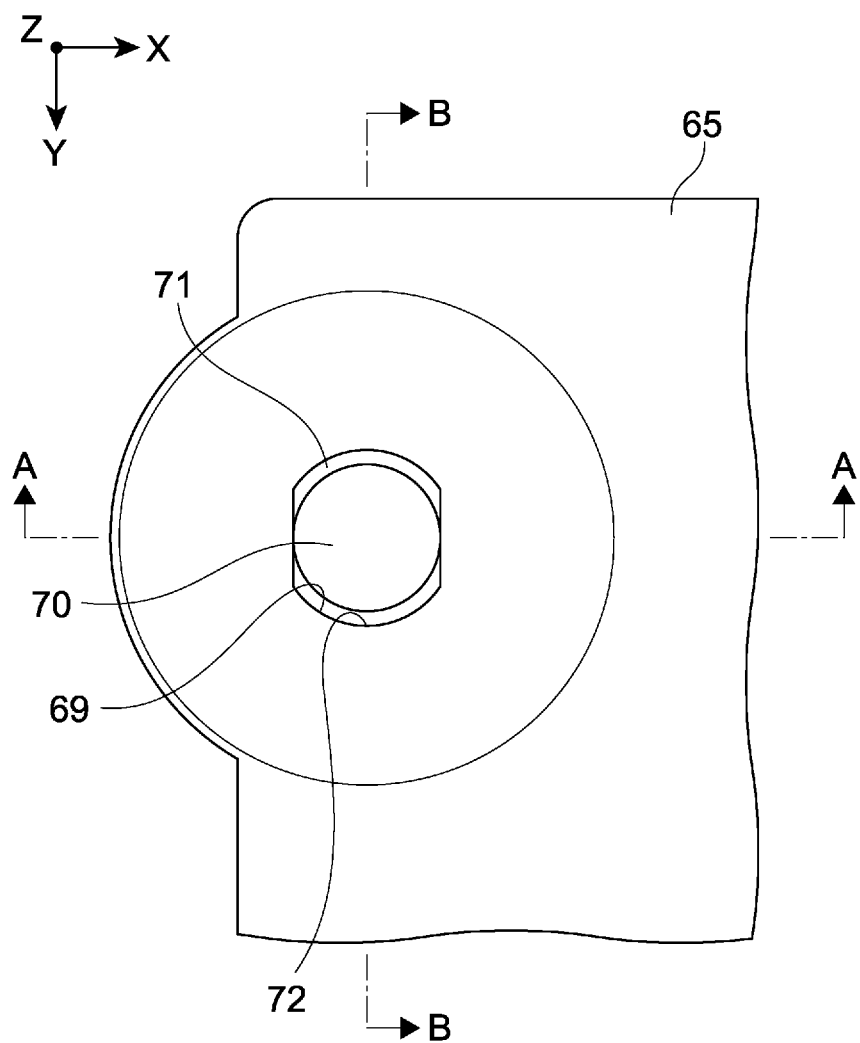
FIG. 13 is a view showing a state where an insertion part of the shaft portion is inserted into a through-hole of the shaft support hole.
Figure 14A:
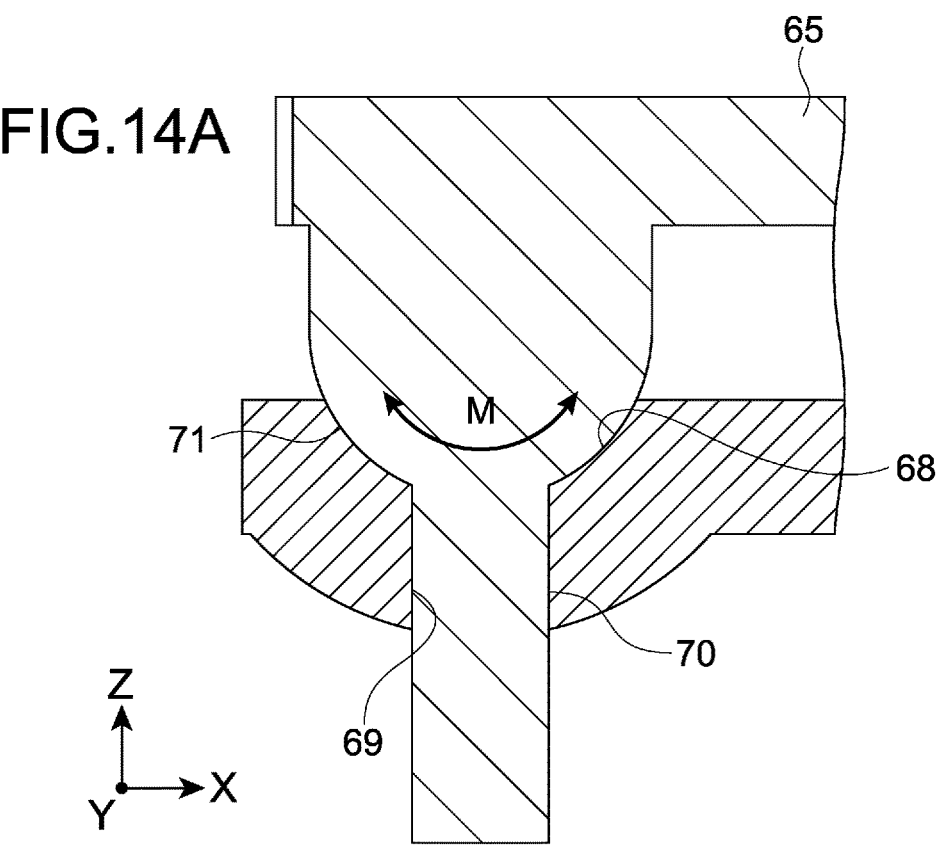
FIGS. 14A and 14B are cross-sectional views each showing a state where the insertion part is inserted.
Figure 14B:
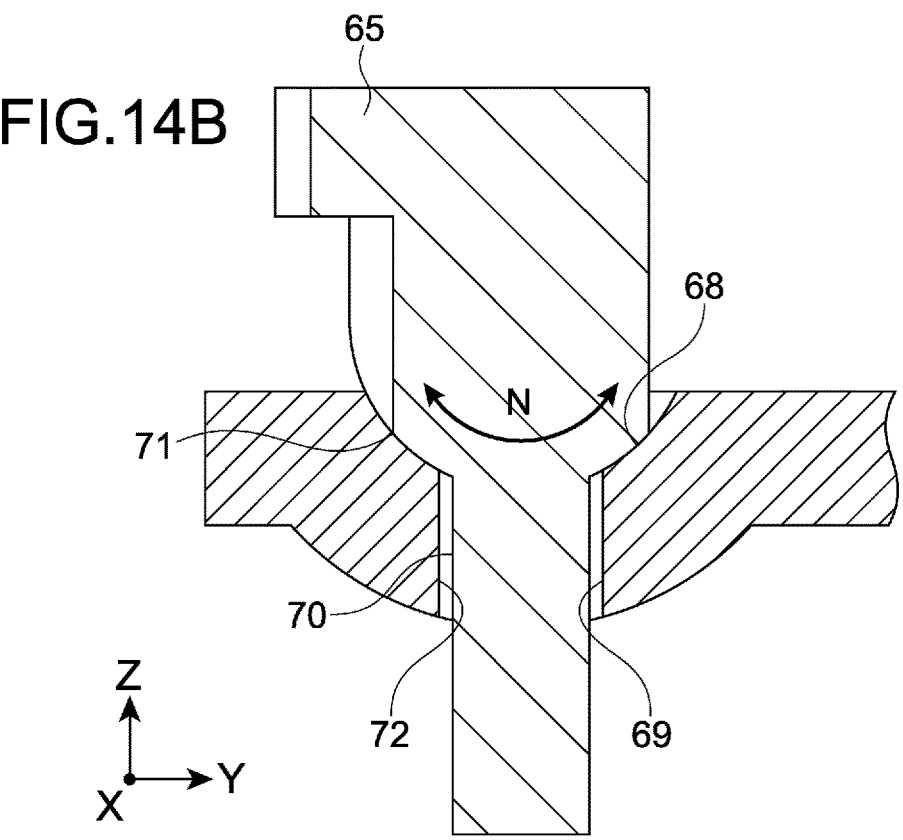

FIG. 13 is a view showing a state where the insertion part 70 of the shaft portion 60 is inserted into the through-hole 69 of the shaft support hole 63. FIG. 13 is a view showing the inserted state of the insertion part 70 viewed from below the lower support portion 65. FIGS. 14A and 14B are cross-sectional views each showing a state where the insertion part 70 is inserted. FIG. 14A is a cross-sectional view taken along the line A-A of FIG. 13, and FIG. 14B is a cross-sectional view taken along the line B-B of FIG. 13.

In FIG. 13, a circular portion within the through-hole 69 is the insertion part 70. A gap between the insertion part 70 and the through-hole 69 is the sphere portion 71 of the shaft portion 60 that is placed on the concave portion 68. In other words, a gap 72 of FIG. 13 corresponds to a gap 72 of FIG. 14B.

As shown in FIG. 14A, in the short-axis direction (x-axis direction) of the through-hole 69, there is no gap between the insertion part 70 of the shaft portion 60 and the through-hole 69. Therefore, it is difficult to tilt the shaft portion 60 along the x-axis direction. In other words, it is difficult to rotate the sphere portion 71 with respect to the concave portion 68 in a direction of the arrow M shown in FIG. 14A.

On the other hand, as shown in FIG. 14B, in the long-axis direction (y-axis direction) of the through-hole 69, the gap 72 exists between the insertion part 70 of the shaft portion 60 and the through-hole 69. Therefore, within the range in which the shaft portion 60 and the through-hole 69 come into contact with each other, the shaft portion 60 can be tilted along the y-axis direction. In other words, it is possible to rotate the sphere portion 71 with respect to the concave portion 68 in a direction of the arrow N shown in FIG. 14B.

As described above, in this embodiment, the shaft support hole 63 including the hemispherical concave portion 68 and the oval through-hole 69 is formed in the lower support portion 65. Then, the insertion part 70 to be inserted into the through-hole 69 and the sphere portion 71 to be supported by the concave portion 68 are formed in the shaft portion 60. Thus, the lower support portion 65 can support the shaft portion 60 so as to be rotatable and tiltable.

In other words, in this embodiment, a biaxial drive mechanism is achieved, as shown in FIG. 9. Specifically, the biaxial drive mechanism includes a rotary drive system in which the shaft portion 60 (axis B) is used as a rotating shaft and a rotary drive system (tilt drive system) in which an axis C with the shaft support hole 63 being as a reference is used as a rotating shaft. Thus, in the rotation direction and the tilt direction of the shaft portion 60, an angle of the planar reflecting surface 37 can be adjusted. It should be noted that the tilt direction is the y-axis direction, that is, a direction of the long axis 1 of the through-hole 69, but a tilt direction along the coupling portion 56, which will be described later, is a rotation direction in which the axis C is used as a rotating shaft.

It should be noted that as shown in FIGS. 11A and 11B and the like, another shaft support hole 63 is formed in the other end portion of the lower support portion 65. In such a way, the plurality of shaft support holes 63 may be formed so that a shaft support hole 63 into which the shaft portion 60 is to be inserted may be appropriately selected based on the position at which the planar reflecting surface 37 is arranged, for example. Thus, the degree of freedom on the design of the light collecting unit 30 can be increased.

The length of the long axis 1 of the through-hole 69 may be set in accordance with an angle at which the shaft portion 60 is tilted. As the long axis 1 becomes longer, a tiltable angle also becomes larger. When the long axis 1 is short, the tiltable angle is small. In this embodiment, the long axis 1 is set to coincide with the y-axis direction, which allows the shaft portion 60 to be tilted in the y-axis direction. Though not limited to the case where the tilt direction is set to be the y-axis direction, the direction of the long axis 1 may be appropriately set. Thus, a tiltable direction can also be appropriately set.

It should be noted that a configuration for supporting the shaft portion 60 to be rotatable and tiltable is not limited to the above configuration, and any configuration may be adopted. Further, the material of the support frame 55 including the lower support portion 65 or the material of the member holding portion 54 including the shaft portion 60, and the like are also not limited to the above materials, and metal, plastic, and the like may be appropriately used therefor.

As shown in FIG. 9, the support frame 55 is supported by a frame support portion 74. The frame support portion 74 is included in the support portion 33 that supports the planar reflecting portion 36 and the like as one unit. In this embodiment, the support frame 55 is supported so as to be movable with respect to the frame support portion 74 in the front-back direction of the light source apparatus 100 (y-axis direction). When the support frame 55 is moved in the y-axis direction, the member holding portion 54 and the support frame 55 are integrally moved. Thus, the position of the planar reflecting surface 37 is adjusted.

The configuration of a movement mechanism for allowing the support frame 55 to be movable is not limited. For example, guide portions and the like that guide the support frame 55 may be formed at the upper and lower portions of the frame support portion 74. Alternatively, a movement mechanism may be configured by appropriately using a spring member or the like that exerts an elastic force in a movement direction. In addition thereto, any configuration may be adopted. By the movement mechanism, a linear drive mechanism with an axis D being as a drive axis is achieved.

With reference to FIGS. 9 and 10, the coupling portion 56 will be described. As described above, the coupling portion 56 is attached to the attachment portion 61 formed at the upper portion of the member holding portion 54. At the upper portion of the attachment portion 61, the operation portion 64 (shaft portion 60) and a protrusion portion 75 located adjacent to the operation portion 64 are formed.

As shown in FIG. 9 and the like, the coupling portion 56 is such an L-shaped member that one end portion of an oblong plate member is folded by about 90 degrees. The coupling portion 56 includes a planar portion 76 and a leading end portion 77 that is folded by about 90 degrees with respect to the planar portion 76. The coupling portion 56 is arranged such that the planar portion 76 is located on the attachment portion 61 and the upper support portion 66 of the support frame 55. Further, the coupling portion 56 is arranged such that the leading end portion 77 is located on the side of a front surface 78 of the attachment portion 61.

An opening 80 is formed substantially at the center of the planar portion 76 along the longitudinal direction thereof. The protrusion portion 75 formed on the attachment portion 61 is inserted into the opening 80 so as to be movable within the opening 80. An opening 81 is also formed along the longitudinal direction of the planar portion 76 at an end portion thereof on the side opposite to the leading end portion 77. A screw 83 is mounted into the opening 81 via a washer 82. The coupling portion 56 and the upper support portion 66 of the support frame 55 are connected to each other via the screw 83.

The position and angle of the planar reflecting surface 37 are adjusted with the screw 83 being temporarily jointed. By the rotation of the operation portion 64, the angle of the planar reflecting surface 37 about the shaft portion 60 is adjusted. Thus, the position of the light collecting point 8 in the horizontal direction can be adjusted. Further, the operation portion 64 is moved in the front-back direction so as to tilt the shaft portion 60, and thus the tilt of the planar reflecting surface 37 can be adjusted. Thus, the position of the light collecting point 8 in the height direction can be adjusted. Further, the position of the support frame 55 in the front-back direction is adjusted, and thus a focus position of the light collecting point 8 can be adjusted.

Along with those adjustments, the coupling portion 56 is moved. For example, a relative position of the protrusion portion 75 with respect to the opening 80 formed on the planar portion 76 is changed. Further, a relative position of the screw 83 with respect to the opening 81 is changed (see movement of the coupling portion 56 of FIG. 9). Furthermore, the coupling portion 56 is moved also in a rotation direction about the screw 83. Movement amounts of the respective components are changed depending on the way of adjustment.

When the adjustments are finished, the screw 83 is fastened so that the coupling portion 56 and the upper support portion 66 are fixed to the frame support portion 74. Further, as shown in FIG. 10, a fixing member 84 is provided to sandwich the leading end portion 77 of the coupling portion 56 and a rear surface of the attachment portion 61. Thus, the member holding portion 54 is fixed at a predetermined position and angle. As a result, the planar reflecting surface 37 is fixed at a predetermined position and angle. It should be noted that a method of fixing the member holding portion 54 is not limited.

Here, a specific example of the light collecting unit according to this embodiment will be described. In the following description on the example, xyz coordinates to be used are set in directions different from those described above.

Figure 15:
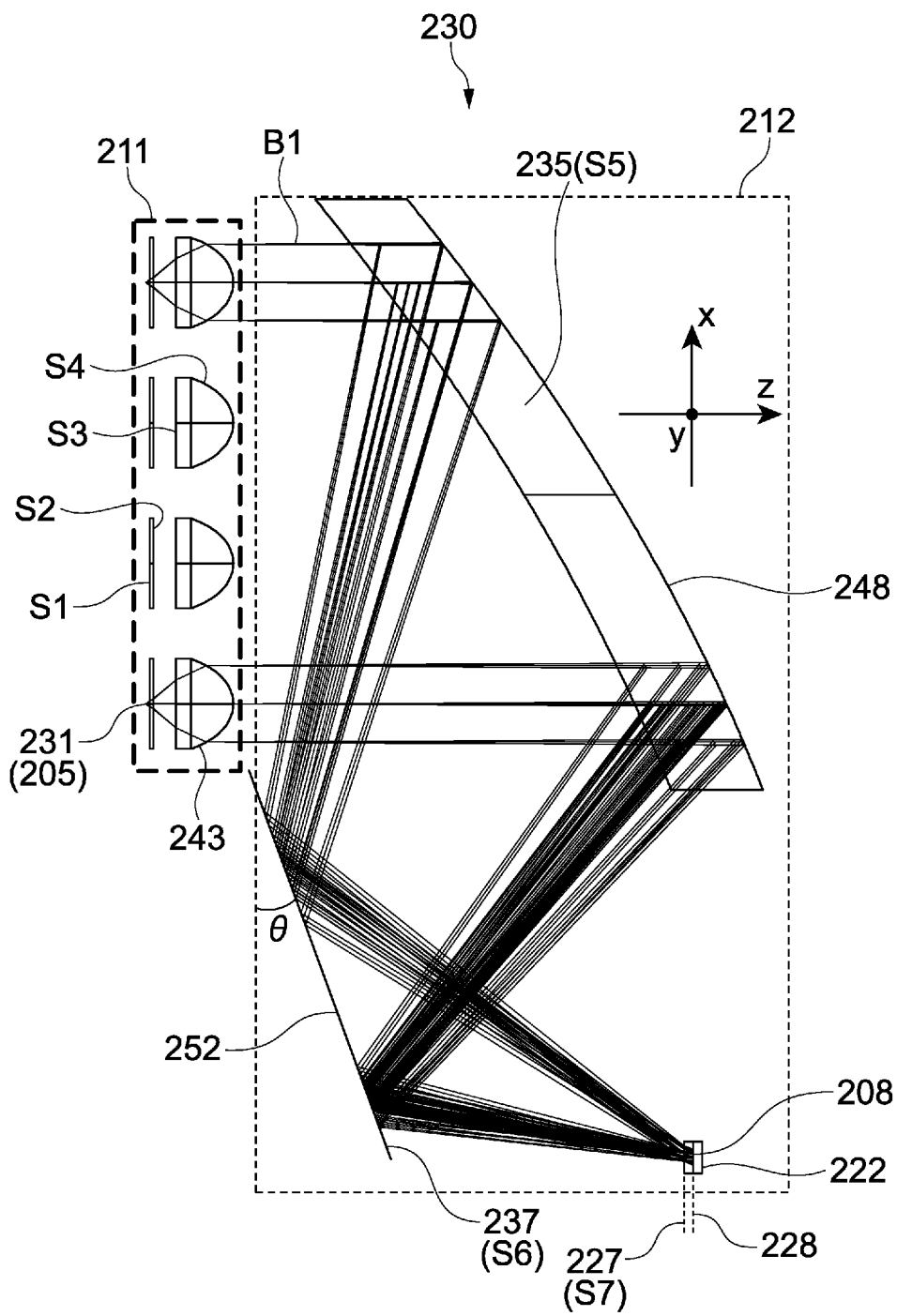
FIG. 15 is a view showing a configuration of a light collecting unit as a specific example.
Figure 16:
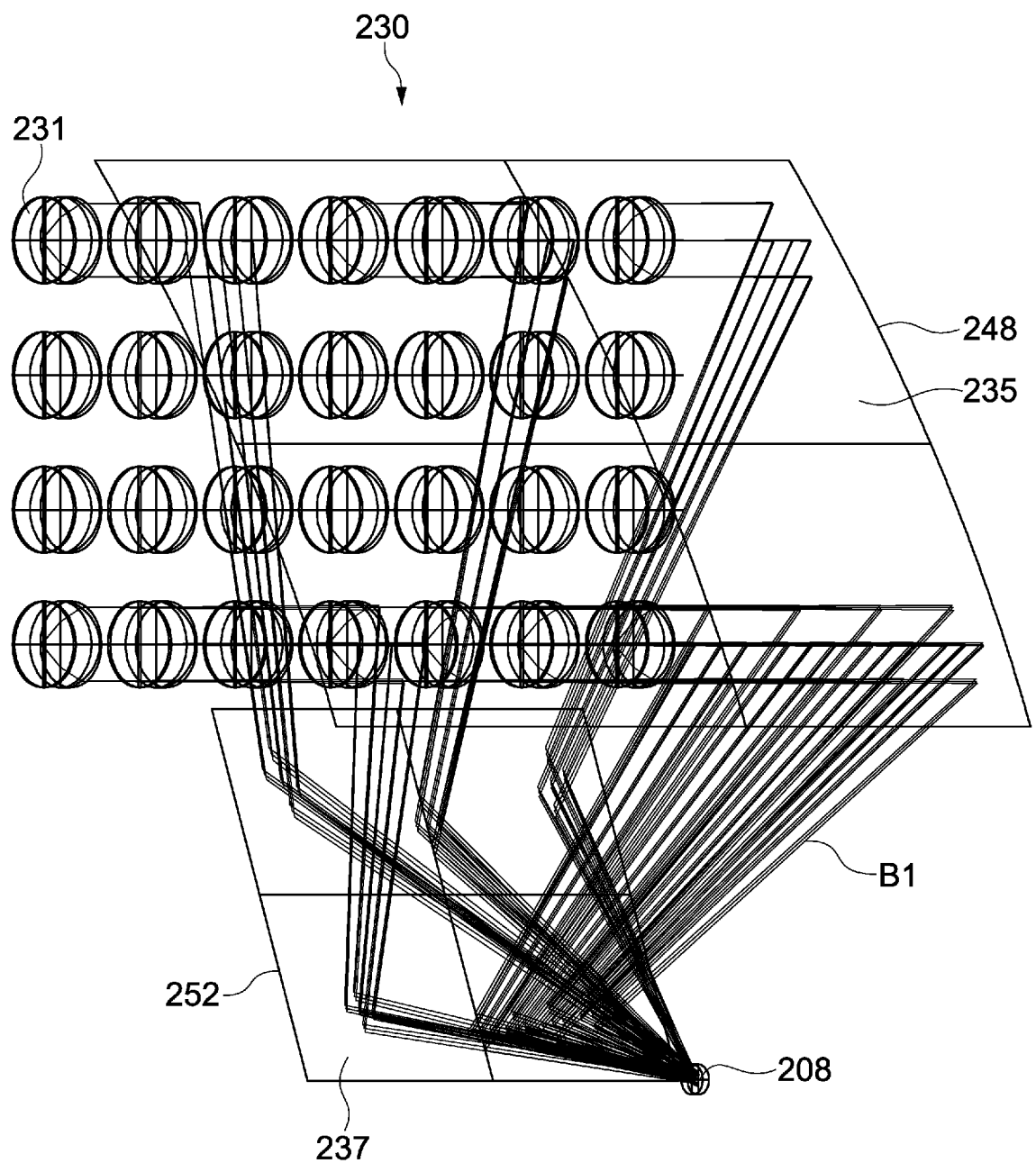
FIG. 16 is a view showing a configuration of the light collecting unit in the example.

FIGS. 15 and 16 are views each showing a configuration of a light collecting unit 230 according to this example. FIG. 16 is a view of the light collecting unit 230 viewed obliquely from the rear surface side of a plurality of laser light sources 231.

As shown in FIGS. 15 and 16, light fluxes from the plurality of laser light sources 231 are converted into substantially parallel light fluxes by collimator lenses 243 provided to the respective laser light sources 231. Blue laser light B1 converted into the substantially parallel light flux is reflected on an aspheric reflecting surface 235 of a reflecting member 248 to be collected. The blue laser light B1 reflected on the aspheric reflecting surface 235 is then reflected on a planar reflecting surface 237 and collected to a predetermined light collecting point 208 on a phosphor layer 222.

Figure 17:
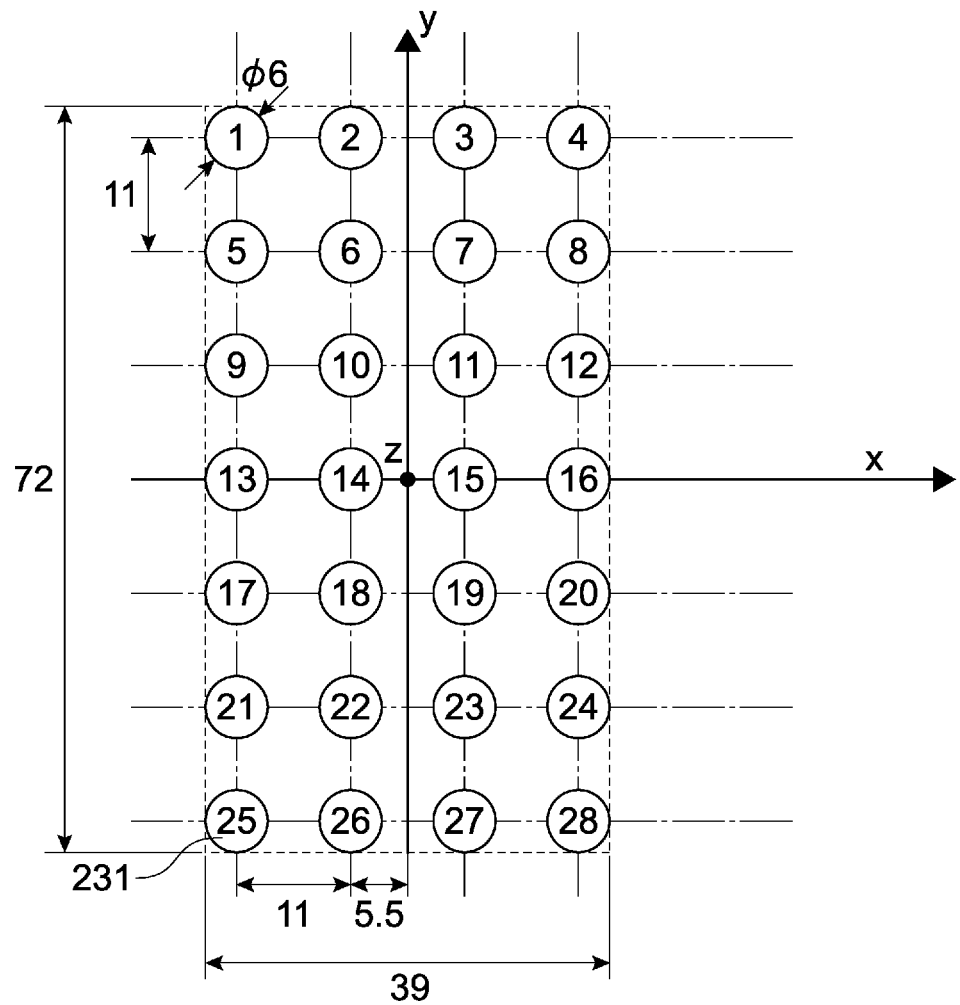
FIG. 17 is a view showing the number of laser light sources and arrangement positions thereof in the example.

FIG. 17 is a view showing the number of laser light sources 231 and arrangement positions thereof in the example. The xyz coordinates shown in FIG. 17 correspond to the xyz coordinates shown in FIG. 15. As shown in FIG. 17, in this example, a laser light source array including 28 pieces of laser light sources 231 is used. The 28 pieces of laser light sources 231 are arranged in matrix of four laser light sources 231 along the x-axis direction by seven laser light sources 231 along the y-axis direction. It should be noted that the number of laser light sources 231 is not limited.

The laser light sources 231 are arranged at intervals of 11 mm in the x-axis direction and the y-axis direction. The laser light B1 of the substantially parallel light flux output from the collimator lens 243 has a light flux diameter of 6 mm. Therefore, the blue laser light B1 of the substantially parallel light fluxes is applied to the aspheric reflecting surface 235 in the range of 39 mm in the x-axis direction and 72 mm in the y-axis direction.

FIGS. 18 and 19 are tables each showing data on the light collecting unit 230. A first optical system in the table refers to an optical system denoted by reference numeral 211 of FIG. 15. In the first optical system, the light fluxes of the blue laser light B1 output from the plurality of laser light sources 231 are converted into substantially parallel light fluxes. The optical system including the plurality of collimator lenses 243 corresponds to the first optical system 211. A second optical system in the table refers to an optical system denoted by reference numeral 212 of FIG. 15. In the second optical system, the blue laser light B1 from the plurality of laser light sources 231, which are converted into the substantially parallel light fluxes by the first optical system 211, are collected to the predetermined light collecting point 208. The optical system including the aspheric reflecting surface 235 and the planar reflecting surface 237 corresponds to the second optical system 212.

An object side NA in the table refers to a numerical aperture of the collimator lens 243 to the blue laser light B1 from each laser light source 231. A focal length f1 of the first optical system 211 is a focal length of the collimator lens 243 (unit thereof is mm). A focal length f2 of the second optical system 212 is a focal length of the optical system including the aspheric reflecting surface 235 and the planar reflecting surface 237 (unit thereof is mm). However, since the focal length of the planar reflecting surface 237 is infinity, the focal length f2 is a focal length of the aspheric reflecting surface 235.

A first light-source surface of the first optical system 211 corresponds to an initial surface of the array and also corresponds to output surfaces of 28 pieces of the laser light sources 231. A surface S1 is a surface of a cover glass 205 on the side of the light source (see FIG. 15). The cover glass 205 covers the laser light source 231. A surface S2 is the other surface of the cover glass 205, that is, a surface on the side from which the laser light B1 is output. A surface S3 is a planar surface of the collimator lens 243 on the side of the laser light source 231. A surface S4 is an aspheric surface of the collimator lens 243 and is to be an end surface of the array. The surfaces S1 to S4 are included in the first optical system 211.

A surface S5 and the following surfaces are included in the second optical system 212. The surface S5 is the aspheric reflecting surface 235 of the reflecting member 248. A surface S6 is the planar reflecting surface 237 of a planar reflecting member 252. The surface S6 is set as an eccentric surface that is eccentric with respect to an x-y plane formed of the x axis and the y axis of FIG. 15. A surface S7 is a surface 227 that is on the side opposite to an arrangement surface 228 on which the phosphor layer 222 is arranged. A second light-source surface of the second optical system 212 corresponds to a surface to which the blue laser light B1 of the phosphor layer 222 is input.

The table of FIG. 18 shows a curvature radius (mm) of each surface, an interval between surfaces (mm), and a refractive index n for blue laser light with a wavelength of 445 nm. The curvature radius and the interval are denoted by symbols of plus and minus with the z axis of FIG. 15 being as a reference. It should be noted that the infinity of the curvature radius means that a surface of the curvature radius is planar. The refractive index n is described for substrates including the cover glass 205, the collimator lens 243, and the arrangement surface 228.

FIG. 19 shows data of the aspheric surfaces, that is, the surface S4 and the surface S5, and data of the surfaces that are set to be eccentric, that is, the surface S6 and the surface S7. In this embodiment, an aspheric surface is represented by the following equation. It should be noted that in the equation, c represents a curvature, K represents a conic constant, and Ai represents a correction factor.

$$z = \frac{ch^2}{1+\{1-(1+K)c^2h^2\}^{1/2}} + \sum_{i=1} A_i h^i \qquad \text{[Math. 1]}$$

The surface S4 serving as the aspheric surface of the collimator lens 243 is expressed by substituting the conic constant K and the correction factor Ai shown in FIG. 19 into the above equation. Further, the curvature c is obtained from the curvature radius of FIG. 18. The surface S5 serving as the aspheric reflecting surface is a paraboloidal surface whose conic constant K is −1. The surface S6 serving as the eccentric surface is eccentric by 20 degrees with respect to the xy plane shown in FIG. 15 in a clockwise direction about the y axis. The surface S7 is arranged in parallel to the xy plane without rotating and is shifted in the x-axis direction by 14.97 mm.

For example, the plurality of laser light sources 231, the aspheric reflecting surface 235, and the planar reflecting surface 237 described in this example are supported as one unit by the support portion, which can achieve the light collecting unit 230 according to an embodiment of the present disclosure. It should be noted that the specific shapes and numerical values of the respective portions described in this example are part of examples of embodiments for carrying out the present disclosure, and the technical range of the present disclosure is not limited by those examples.

Figure 20:
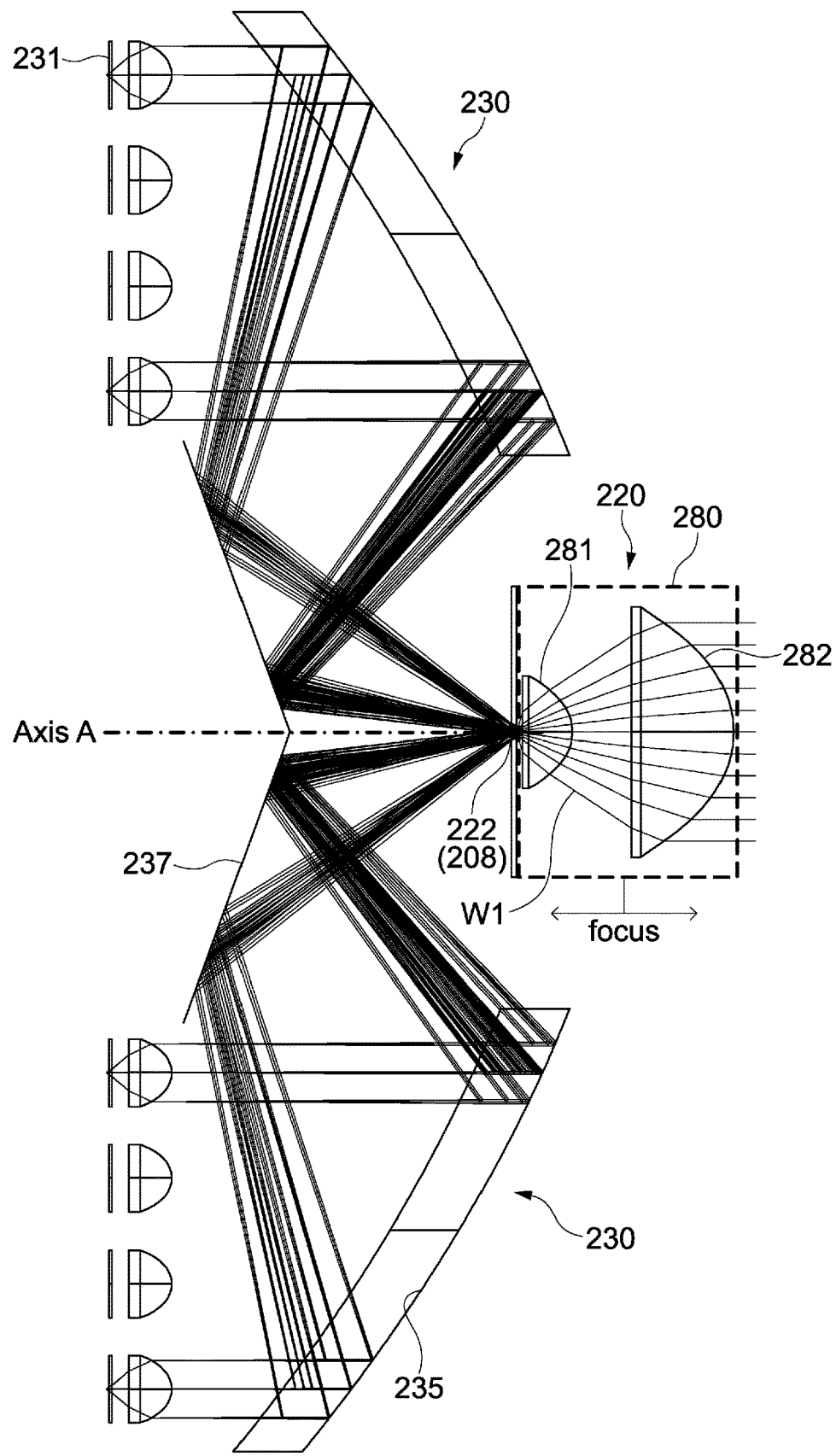
FIG. 20 is a view showing a configuration example in the case where two light collecting units shown in FIG. 15 are arranged.

FIG. 20 is a view showing a configuration example in the case where two light collecting units 230 shown in FIG. 15 are arranged. FIG. 20 corresponds to the configuration shown in FIG. 2. The two light collecting units 230 are arranged at respective two positions that are symmetric about the axis A passing through the phosphor layer 222. The axis A corresponds to an optical axis of light output from a phosphor unit 220. With such a configuration, the number of laser light sources 231 is doubled, that is, 56 pieces, and thus a high luminance of white light output from the phosphor layer 222 can be achieved.

Figure 21:
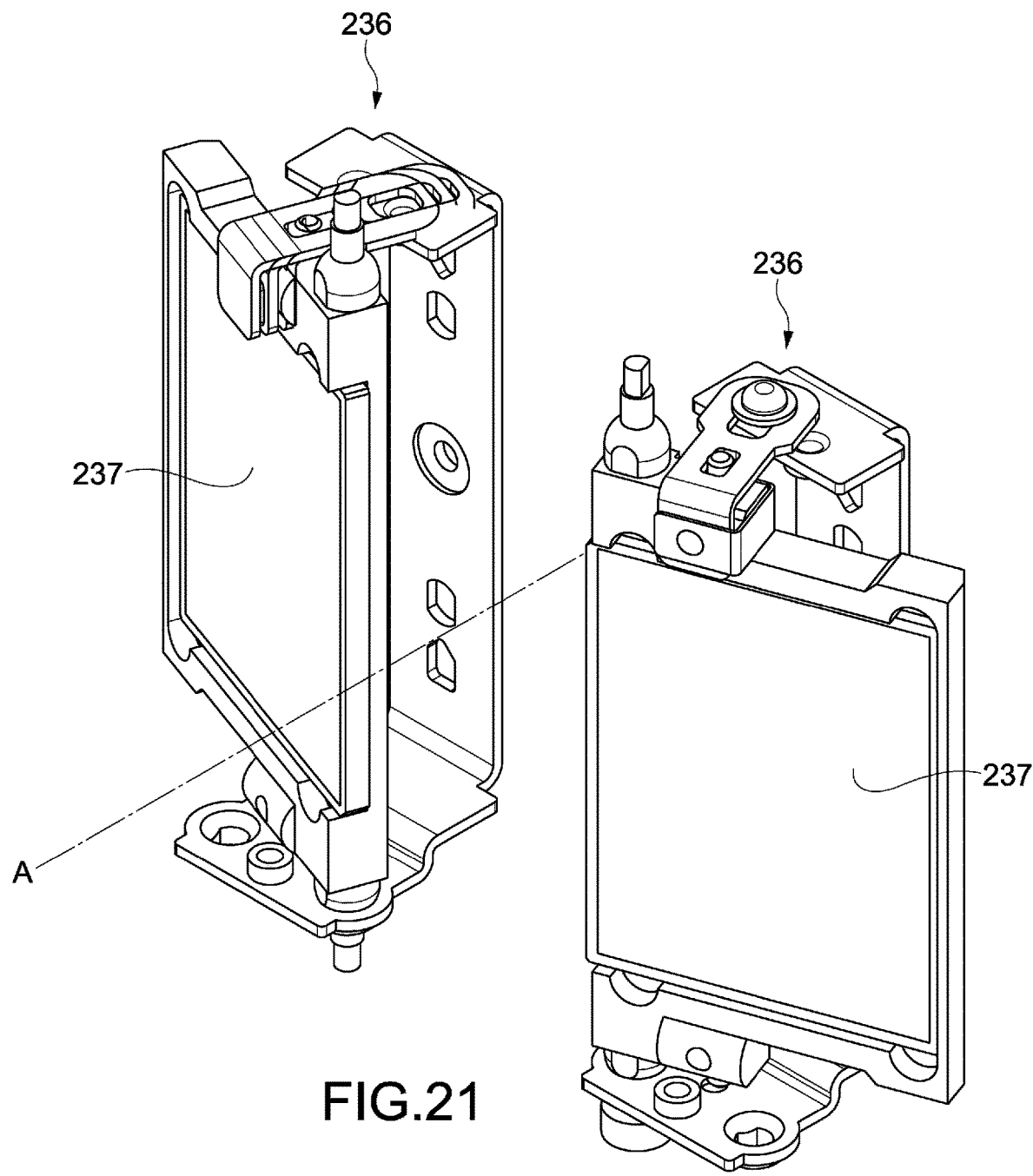
FIG. 21 is a perspective view showing two planar reflecting portions in the configuration example shown in FIG. 15.

As shown in FIG. 21, two planar reflecting portions 236 of the respective light collecting units 230 are arranged to be symmetric about the axis A. As described above, the positions and angles of the planar reflecting surfaces 237 are appropriately set so that the blue laser light B1 from the two light collecting units 230 are collected to the phosphor layer 222. Since the two planar reflecting portions 236 are arranged to be symmetric about the axis A, the adjustment of the two planar reflecting surfaces 237 is also performed in a substantially the same manner. Therefore, the adjustment can be easily performed.

It should be noted that the blue laser light B1 from the two light collecting units 230 may be collected at one light collecting point 208. On the other hand, a light collecting point 208 may be set for each light collecting unit 230 at a different position on the phosphor layer 222. Thus, the deterioration of the phosphor layer 222 can be suppressed.

For example, two light collecting points 208 are set at positions that are different in distance from the rotating shaft of the phosphor wheel. When the phosphor wheel is rotated, the blue laser light B1 is collected on each of two circles with the rotating shaft as the center. Thus, the saturation, burning, and the like of the phosphor can be prevented. This idea can be applied to a case where the number of light collecting units is increased.

For example, when light coming from 56 pieces of the laser light sources 231 is intended to be collected with a light collecting lens, a huge lens has to be used. However, since the light collecting unit 230 having the aspheric reflecting surface 235 is used in this embodiment, an increase in size of the light source apparatus can be suppressed. Therefore, a high luminance can be attained while an increase in size of the apparatus is suppressed.

It should be noted that the phosphor unit 220 shown in FIG. 20 includes an output optical system 280 in which a focal length is variable. The output optical system 280 can convert a light flux of white light W1 output from the phosphor layer 222 into a substantially parallel light flux.

Figure 23:
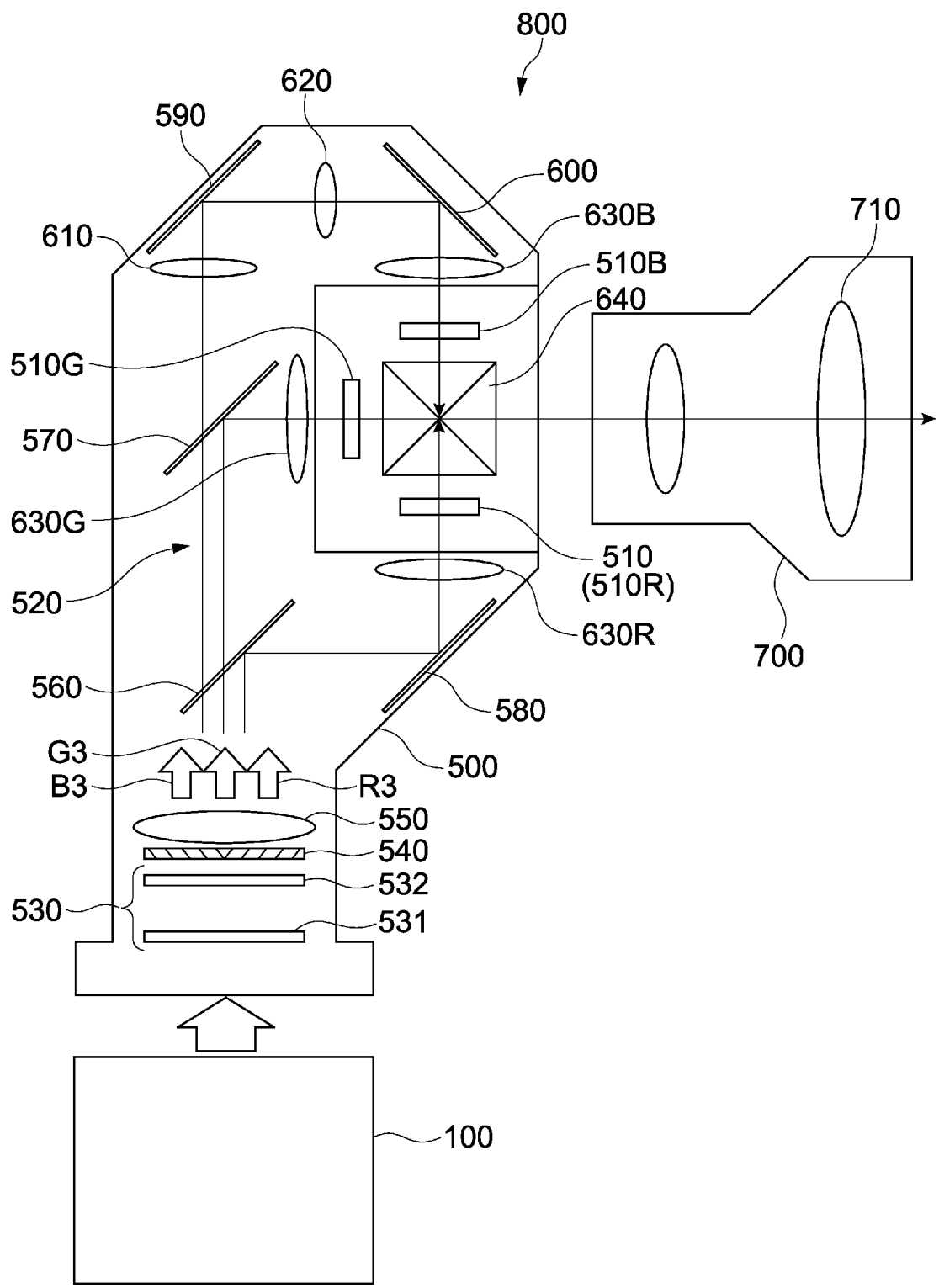
FIG. 23 is a schematic view showing a configuration example of a projector that serves as an image display apparatus according to an embodiment of the present disclosure.

The output optical system 280 is an optical system for taking in the light flux emitted from the phosphor layer 222 into a lighting system 500 (see FIG. 23). As shown in FIG. 20, the axis A passing through the phosphor layer 222 is an optical axis of the light collecting unit 230. Light is emitted from the phosphor layer 222 in a substantial lambertian pattern, and the emitted light flux is converted into a substantially parallel light flux by the output optical system 280 and then output to the lighting system 500.

As described above, the focal length of the output optical system 280 is variable. For example, a focusing mechanism that moves the output optical system 280 in the optical axis direction is provided. Thus, it is possible to efficiently take in the light flux emitted from a light-emitting source into the lighting system 500 without deterioration.

In this embodiment, two lenses 281 and 282 form the output optical system 280. However, the configurations of the output optical system 280 and the focusing mechanism are not limited.

As described above, in the light source apparatus 100 according to this embodiment, the blue laser light B1 from the plurality of laser light sources 31 is collected by the aspheric reflecting surface 35. The reflected blue laser light B1 is reflected by the planar reflecting surface 37 and then collected at the predetermined point 8 of the phosphor layer 22. The light source portion 32 including the plurality of laser light sources 31, the aspheric reflecting surface 35, and the planar reflecting portion 36 including the planar reflecting surface 37 are supported as one unit by the support portion 33.

Thus, for example, even when the number of laser light sources 31 is increased in order to attain a high luminance, an increase in size of the light collecting unit 30 can be suppressed. In other words, the blue laser light B1 from the plurality of laser light sources 31 can be collected in a compact space. Further, the design according to the number of laser light sources 31 to be used, the shape according to a limited space, and the like can be easily achieved. Specifically, the aspheric reflecting surface 35 and the planar reflecting surface 37 are included in the light collecting optical system 34 so that the light collecting units 30 having various sizes, shapes, and the like can be configured. As a result, it is possible to attain a high luminance while suppressing an increase in size of the apparatus and easily achieve a structure corresponding to a necessary luminance or shape.

For example, a laser light source array having a space at the center thereof is used and an aspheric reflecting surface is arranged in front of the laser light source array. The aspheric reflecting surface is arranged such that light from laser light sources is reflected toward the center space and then collected. Further, an opening is formed at the center of the aspheric reflecting surface.

At the center area of the laser light source array, a planar reflecting surface is arranged and the light reflected on the aspheric reflecting surface is reflected on the planar reflecting surface. The reflected light passes through the opening of the aspheric reflecting surface and is collected on a phosphor layer. Such a configuration may be adopted, for example. In this case, the size of the light collecting unit in the optical axis direction or the size thereof viewed from the front can be reduced.

In this way, since a light collecting unit having a high luminance and being compact and freely shaped can be achieved, a plurality of light collecting units thus configured can be easily arranged. In other words, it is possible to accept a multi-unit. Further, light collecting units having various configurations can be appropriately combined to support various specifications. Furthermore, since the light collecting optical system includes not a lens but an aspheric reflecting surface, less limitation on spaces and optical paths is assumed and thus the arrangement, shape, and the like of the members can be flexibly changed. Moreover, since the optical system collects light at one point, there are no limitations on an incident angle and the like of the light coming into the planar reflecting surface, and various configurations can be appropriately achieved. In addition, the degree of freedom on the number of laser light sources to be used and a luminance is increased.

Figure 22A:
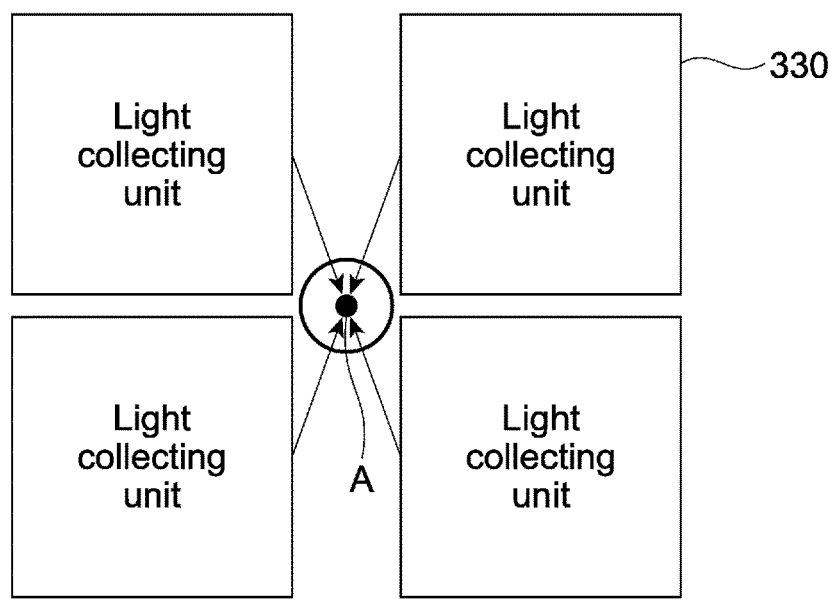
FIGS. 22A and 22B are schematic views each showing another configuration example in which a plurality of light collecting units are arranged.
Figure 22B:
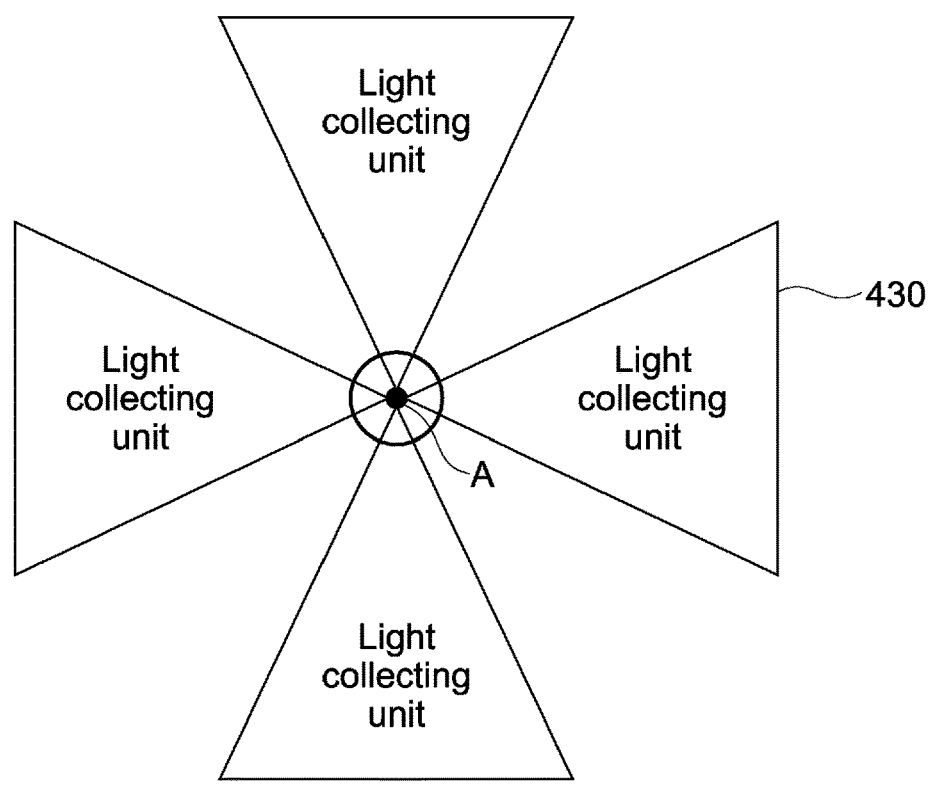

FIGS. 22A and 22B are schematic views each showing another configuration example in which a plurality of light collecting units are arranged. For example, as shown in FIGS. 22A and 22B, four light collecting units 330 (430) may be arranged to be symmetric about the optical axis A. Each of the light collecting units 330 (430) is appropriately adjusted such that light is collected at a light collecting point on the optical axis A. The number of light collecting units to be arranged is not limited, and more light collecting units may be arranged.

In FIG. 22A, a surface having a rectangular planar shape is used as an arrangement surface on which a plurality of laser light sources are arranged. The planar shape of the arrangement surface is one viewed from an output direction of output light coming from the plurality of laser light sources. For example, in the light source portion 32 shown in FIG. 5, the planar shape of the plate-like frame 39 corresponds to the planar shape of the arrangement surface. As shown in FIG. 22A, the outer shape viewed from the output direction of the light collecting unit 330 is also formed into a rectangular shape according to the shape of the arrangement surface.

In FIG. 22B, a surface having a triangular shape is used as an arrangement surface on which a plurality of laser light sources are arranged. Therefore, the outer shape of the light collecting unit 430 can also be formed into a triangular shape. Since an aspheric reflecting surface is used as the light collecting optical system, the degree of freedom on the number of light sources, the arrangement thereof, and the like is increased. This is because the shape, size, and the like of the aspheric reflecting surface can be appropriately designed according to light fluxes from light sources. As a result, such a light source that a plurality of light sources are arranged on the arrangement surface having a triangular shape as shown in FIG. 22B can be used. Then, a light collecting unit whose outer shape viewed in the optical axis direction is a triangular shape can be achieved.

Since the shape of the light collecting unit can be freely set as described above, it is easy to form the shape of the light collecting unit into a shape appropriate to a multi-unit and also arrange a plurality of light collecting units in a limited space. As a result, the downsizing of the light source apparatus can be achieved.

Additionally, the arrangement of the plurality of light collecting units to be symmetric about the optical axis A can lead to the degree of freedom on the number of light collecting units and a combination of light collecting units having various shapes. As a result, various specifications can be supported. It should be noted that the planar shape of the arrangement surface is not limited to a rectangular or triangular shape and may be a multangular shape, a circular shape, and the like. The shape of the arrangement surface may also be appropriately set according to the shape of a necessary light collecting unit.

(Image Display Apparatus)

An image display apparatus according to this embodiment will be described. Here, a projector capable of mounting the light source apparatus described in the above embodiment will be described as an example. FIG. 23 is a schematic view showing a configuration example of the projector.

A projector 800 includes the light source apparatus 100 according to the embodiment of the present disclosure, a lighting system 500, and a projection system 700. The lighting system 500 includes an image generation element 510 and a lighting optical system 520. The image generation element 510 generates an image based on applied light. The lighting optical system 520 applies output light coming from the light source apparatus 100 to the image generation element 510. The projection system 700 projects the image generated by the image generation element 510.

As shown in FIG. 23, the lighting system 500 includes an integrator element 530, a polarization conversion element 540, and a light collecting lens 550. The integrator element 530 includes a first fly-eye lens 531 and a second fly-eye lens 532. The first fly-eye lens 531 includes a plurality of microlenses two-dimensionally arranged. The second fly-eye lens 532 includes a plurality of microlenses that are arranged to correspond to the respective microlenses of the first fly-eye lens 531.

Parallel light that enters the integrator element 530 from the light source apparatus 100 is split into a plurality of light fluxes by the microlenses of the first fly-eye lens 531 to form images on the corresponding microlenses of the second fly-eye lens 532. The microlenses of the second fly-eye lens 532 each function as a secondary light source and apply a plurality of parallel light beams with the same luminance to the polarization conversion element 540 as incident light.

The integrator element 530 has a function of trimming the incident light to be applied to the polarization conversion element 540 from the light source apparatus 100 so as to have a uniform luminance distribution as a whole.

The polarization conversion element 540 has a function of making a polarization state of incident light uniform, the incident light being input via the integrator element 530 and the like. For example, the polarization conversion element 540 outputs output light including blue laser light B3, green light G3, and red light R3 via the light collecting lens 550 and the like arranged on the output side of the light source apparatus 100.

The lighting optical system 520 includes dichroic mirrors 560 and 570, mirrors 580, 590, and 600, relay lenses 610 and 620, field lenses 630R, 630G, and 630B, liquid crystal light valves 510R, 510G, and 510B serving as the image generation element, and a dichroic prism 640.

The dichroic mirrors 560 and 570 have property of selectively reflecting light of color in a predetermined wavelength range and transmitting light in the other wavelength range. With reference to FIG. 23, for example, the dichroic mirror 560 selectively reflects the red light R3. The dichroic mirror 570 selectively reflects the green light G3 out of the green light G3 and the blue light G3 having passed through the dichroic mirror 560. The remaining blue light G3 passes through the dichroic mirror 570. Thus, the light output from the light source apparatus 100 is split into a plurality of light beams with different colors.

The split red light R3 is reflected on the mirror 580, converted into parallel light by passing through the field lens 630R, and then input into the liquid crystal light valve 510R for modulation of red light. The green light G3 is converted into parallel light by passing through the field lens 630G and then input into the liquid crystal light valve 510G for modulation of green light. The blue light G3 passes through the relay lens 610 and is reflected on the mirror 590, and further passes through the relay lens 620 and is reflected on the minor 600. The blue light G3 reflected on the minor 600 is converted into parallel light by passing through the field lens 630B, and then input into the liquid crystal light valve 510B for modulation of blue light.

The liquid crystal light valves 510R, 510G, and 510B are electrically connected to a signal source (for example, personal computer (PC)) (not shown) that supplies an image signal containing image information. The liquid crystal light valves 510R, 510G, and 510B modulate the input light for each pixel based on supplied image signals of the respective colors, and generate a red-color image, a green-color image, and a blue-color image, respectively. The modulated light of each color (formed image) is input into the dichroic prism 640 to be combined. The dichroic prism 640 superposes and combines the light beams of the respective colors that are input from the three directions, and then outputs the combined light toward the projection system 700.

The projection system 700 includes a plurality of lenses 710 and the like and applies the light combined by the dichroic prism 640 onto a screen (not shown). Thus, a full-color image is displayed.

The light source apparatus 100 according to the embodiment of the present disclosure allows the projector 800 to be downsized. Further, the appropriate setting of the shape and the like of the light source apparatus 100 allows the designs of the outer shape of the projector 800 to be improved, for example.

(Other Embodiments)

The present disclosure is not limited to the embodiment described above and can achieve other various embodiments.

In the projector 800 shown in FIG. 23, the lighting system 500 formed of a transmissive liquid crystal panel is described. However, the lighting system can also be formed of a reflective liquid crystal panel. A digital micro-minor device (DMD) and the like may be used as the image generation element. Additionally, a polarization beam splitter (PBS), a color combining prism that combines video signals of colors of RGB, a total internal reflection (TIR) prism, and the like may be used, instead of the dichroic prism 640.

Further, in the embodiment described above, an apparatus other than the projector may be formed as the image display apparatus according to the embodiment of the present disclosure. In addition, the light source apparatus according to the embodiment of the present disclosure may be used for an apparatus other than the image display apparatus.

At least two of feature points of the embodiment described above may be combined.

It should be noted that the present disclosure can have the following configurations.

(1) A light source unit comprising:
at least two reflecting surfaces configured to reflect a first light and/or collect the first light to a point on a light emitter,
wherein at least one of the at least two reflecting surfaces is an aspheric reflecting surface.

(2) The light source unit of (1), wherein at least one of the at least two reflecting surfaces is a planar reflecting surface.

(3) The light source unit of (1), wherein:
the light emitter converts at least a portion of the first light into a second light, wherein the light emitter comprises a phosphor layer rotatable upon a shaft; and
a wavelength of the first light is shorter than a wavelength of the second light.

(4) The light source unit of (1), further comprising:
a support portion configured to support each of the at least two reflecting surfaces.

(5) The light source unit of (1), further comprising:
a plurality of light sources arranged in a planar array for emitting the first light.

(6) The light source unit of (5), wherein each of the plurality of light sources is a laser.

(7) The light source unit of (5), wherein the aspheric reflecting surface is arranged obliquely with respect to a plane of the planar array.

(8) The light source unit of (5), wherein a direction in which the first light is emitted is substantially the same as a direction in which a second light from the light emitter is emitted.

(9) The light source unit of (1), wherein each of the at least two reflecting surfaces comprises metal and/or glass.

(10) The light source unit of (1), wherein the aspheric reflecting surface is rotationally symmetric.

(11) The light source unit of (1), wherein the aspheric reflecting surface is a paraboloidal reflecting surface.

(12) The light source unit of (1), further comprising:
at least one adjustment mechanism for adjusting a position and/or an angle of at least one of the reflecting surfaces.

(13) The light source unit of (12), wherein the at least one of the reflecting surfaces adjusted by the at least one adjustment mechanism comprises a planar reflecting surface.

(14) The light source unit of (1), wherein the aspheric reflecting surface reflects the first light prior to any of the other at least two reflecting surfaces.

(15) A light source apparatus comprising:
a plurality of light source units, wherein each of the plurality of light source units comprises:
at least two reflecting surfaces configured to reflect a first light and/or collect the first light to a point on a light emitter,
wherein at least one of the at least two reflecting surfaces is an aspheric reflecting surface.

(16) The light source apparatus of (15), wherein the plurality of light source units are arranged symmetrically about an optical axis.

(17) An image display apparatus comprising:
a light source apparatus configured to generate an output light, the light source apparatus comprising at least one light source unit, each of the at least one light source units comprising:
at least two reflecting surfaces configured to reflect a first light and/or collect the first light to a point on a light emitter,
wherein at least one of the at least two reflecting surfaces is an aspheric reflecting surface; and
a lighting member configured to receive the output light and generate an image using the output light.

(18) The image display apparatus of (17), wherein at least one of the at least two reflecting surfaces is a planar reflecting surface.

(19) The image display apparatus of (17), wherein:
the light emitter converts at least a portion of the first light into a second light, wherein
the light emitter comprises a phosphor layer rotatable upon a shaft; and
a wavelength of the first light is shorter than a wavelength of the second light.

(20) The image display apparatus of (17), further comprising: a support portion configured to support each of the at least two reflecting surfaces.

(21) The image display apparatus of (17), further comprising: a plurality of light sources arranged in a planar array for emitting the first light.

(22) The image display apparatus of (21), wherein each of the plurality of light sources is a laser.

(23) The image display apparatus of (21), wherein the aspheric reflecting surface is arranged obliquely with respect to a plane of the planar array.

(24) The image display apparatus of (21), wherein a direction in which the first light is emitted is substantially the same as a direction in which a second light from the light emitter is emitted.

(25) The image display apparatus of (17), wherein each of the at least two reflecting surfaces comprises metal and/or glass.

(26) The image display apparatus of (17), wherein the aspheric reflecting surface is rotationally symmetric.

(27) The image display apparatus of (17), wherein the aspheric reflecting surface is a paraboloidal reflecting surface.

(28) The image display apparatus of (17), further comprising:
at least one adjustment mechanism for adjusting a position and/or an angle of at least one of the reflecting surfaces.

(29) The image display apparatus of (28), wherein the at least one of the reflecting surfaces adjusted by the at least one adjustment mechanism comprises a planar reflecting surface.

(30) The image display apparatus of (17), wherein the aspheric reflecting surface reflects the first light prior to any of the other at least two reflecting surfaces.

It should be noted that the present disclosure can have the following configurations.

(1) A light source unit, including:
a light source portion including at least one solid-state light source capable of outputting light with a predetermined wavelength range as output light;
an aspheric reflecting surface configured to reflect and collect the output light from the at least one solid-state light source;
a planar reflecting portion including a planar reflecting surface configured to reflect the output light reflected on the aspheric reflecting surface to a predetermined point such that the reflected output light is collected at the predetermined point on a light emitter that is excited by the output light and emits visible light with a wavelength longer than that of the output light; and
a support portion configured to support the light source portion, the aspheric reflecting surface, and the planar reflecting portion as one unit.

(2) The light source unit according to (1), in which
the planar reflecting portion includes an adjustment mechanism configured to adjust a position and an angle of the planar reflecting surface.

(3) The light source unit according to (2), in which
the adjustment mechanism includes
a holding portion that includes a shaft portion and is configured to hold the planar reflecting surface integrally with the shaft portion, and
a shaft support portion configured to support the shaft portion to be rotatable and tiltable.

(4) The light source unit according to (3), in which
the adjustment mechanism includes a movement mechanism configured to integrally move the holding portion and the shaft support portion.

(5) The light source unit according to any one of (1) to (4), in which the light source portion includes an arrangement surface, on which the at least one solid-state light source is arranged and whose planar shape viewed in an output direction of the output light is a multangular shape.

(6) The light source unit according to (5), in which the arrangement surface has a triangular shape in plane view in the output direction of the output light.

The present application contains subject matter related to that disclosed in Japanese Priority Patent Application JP 2012-236691 filed in the Japan Patent Office on Oct. 26, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

A optical axis
B1 blue laser light
G2 green light
R2 red light
W1 white light 8,208 light collecting point
20,220 phosphor unit
22,222 phosphor layer
30,230,330,430 light collecting unit
31,231 laser light source
32 light source portion
33 support portion
35,235 aspheric reflecting surface
36,236 planar reflecting portion
37,237 planar reflecting surface
54 member holding portion
55 support frame
56 coupling portion
57 adjustment mechanism
60 shaft portion
74 frame support portion
100 light source apparatus
500 lighting system
510 image generation element
520 lighting optical system
700 projection system
800 projector

The invention claimed is:

1. A light source unit comprising:
at least two reflecting surfaces configured to reflect a first light and/or collect the first light to a focal point on a light emitter; and
a plurality of light sources configured to emit the first light onto a same reflecting surface of the at least two reflecting surfaces, the same reflecting surface being configured to reflect the first light onto a same planar reflecting surface of the at least two reflecting surfaces,
wherein at least one of the at least two reflecting surfaces is an aspheric reflecting surface,
wherein the plurality of light sources are arranged in a planar array for emitting the first light, and
wherein a direction in which the first light is emitted is substantially the same as a direction in which a second light from the light emitter is emitted.

2. The light source unit of claim 1, wherein:
the light emitter converts at least a portion of the first light into a second light, wherein the light emitter comprises a phosphor layer rotatable upon a shaft; and
a wavelength of the first light is shorter than a wavelength of the second light.

3. The light source unit of claim 1, further comprising:
a support portion configured to support each of the at least two reflecting surfaces.

4. The light source unit of claim 1, wherein each of the plurality of light sources is a laser.

5. The light source unit of claim 1, wherein the aspheric reflecting surface is arranged obliquely with respect to a plane of the planar array.

6. The light source unit of claim 1, wherein each of the at least two reflecting surfaces comprises metal and/or glass.

7. The light source unit of claim 1, wherein the aspheric reflecting surface is rotationally symmetric.

8. The light source unit of claim 1, wherein the aspheric reflecting surface is a paraboloidal reflecting surface.

9. The light source unit of claim 1, further comprising:
at least one adjustment mechanism for adjusting a position and/or an angle of at least one of the reflecting surfaces.

10. The light source unit of claim 9, wherein the at least one of the reflecting surfaces adjusted by the at least one adjustment mechanism comprises a planar reflecting surface.

11. The light source unit of claim 1, wherein the aspheric reflecting surface reflects the first light prior to any of the other at least two reflecting surfaces.

12. A light source apparatus comprising:
a plurality of light source units, wherein each of the plurality of light source units comprises:
at least two reflecting surfaces configured to reflect a first light and/or collect the first light to a focal point on a light emitter; and
a plurality of light sources configured to emit the first light onto a same reflecting surface of the at least two reflecting surfaces, the same reflecting surface being configured to reflect the first light onto a same planar reflecting surface of the at least two reflecting surfaces,
wherein at least one of the at least two reflecting surfaces is an aspheric reflecting surface,
wherein the plurality of light sources are arranged in a planar array for emitting the first light, and
wherein a direction in which the first light is emitted is substantially the same as a direction in which a second light from the light emitter is emitted.

13. The light source apparatus of claim 12, wherein the plurality of light source units are arranged symmetrically about an optical axis.

14. An image display apparatus comprising:
a light source apparatus configured to generate an output light, the light source apparatus comprising at least one light source unit, each of the at least one light source units comprising:
at least two reflecting surfaces configured to reflect a first light and/or collect the first light to a focal point on a light emitter; and
a plurality of light sources configured to emit the first light onto a same reflecting surface of the at least two reflecting surfaces, the same reflecting surface being configured to reflect the first light onto a same planar reflecting surface of the at least two reflecting surfaces,
wherein at least one of the at least two reflecting surfaces is an aspheric reflecting surface,
wherein the plurality of light sources are arranged in a planar array for emitting the first light, and
wherein a direction in which the first light is emitted is substantially the same as a direction in which a second light from the light emitter is emitted.

15. The image display apparatus of claim 14, wherein:
the light emitter converts at least a portion of the first light into a second light, wherein the light emitter comprises a phosphor layer rotatable upon a shaft; and
a wavelength of the first light is shorter than a wavelength of the second light.

16. The image display apparatus of claim 14, further comprising:
a support portion configured to support each of the at least two reflecting surfaces.

17. The image display apparatus of claim 14, wherein each of the plurality of light sources is a laser.

18. The image display apparatus of claim 14, wherein the aspheric reflecting surface is arranged obliquely with respect to a plane of the planar array.

19. The image display apparatus of claim 14, wherein each of the at least two reflecting surfaces comprises metal and/or glass.

20. The image display apparatus of claim 14, wherein the aspheric reflecting surface is rotationally symmetric.

21. The image display apparatus of claim 14, wherein the aspheric reflecting surface is a paraboloidal reflecting surface.

22. The image display apparatus of claim 14, further comprising:
   at least one adjustment mechanism for adjusting a position and/or an angle of at least one of the reflecting surfaces.

23. The image display apparatus of claim 22, wherein the at least one of the reflecting surfaces adjusted by the at least one adjustment mechanism comprises a planar reflecting surface.

24. The image display apparatus of claim 14, wherein the aspheric reflecting surface reflects the first light prior to any of the other at least two reflecting surfaces.

* * * * *

UNITED STATES PATENT AND TRADEMARK OFFICE
CERTIFICATE OF CORRECTION

PATENT NO. : 10,495,962 B2
APPLICATION NO. : 14/434476
DATED : December 3, 2019
INVENTOR(S) : Takashi Takamatsu et al.

It is certified that error appears in the above-identified patent and that said Letters Patent is hereby corrected as shown below:

In the Specification

Column 1, Line 14 --Japanese Patent Application Number 2012-236691, filed February 21, 2014-- should read as --Japanese Patent Application Number 2012-236691, filed October 26, 2012--

Page 1 of 1

Signed and Sealed this
Twenty-third Day of June, 2020

Andrei Iancu
*Director of the United States Patent and Trademark Office*